US012340268B2

(12) United States Patent
Lee et al.

(10) Patent No.: US 12,340,268 B2
(45) Date of Patent: Jun. 24, 2025

(54) METHOD AND ELECTRONIC DEVICE FOR SHARING CONTENT

(71) Applicant: SAMSUNG ELECTRONICS CO., LTD., Suwon-si (KR)

(72) Inventors: Sujin Lee, Suwon-si (KR); Jongwoo Jung, Suwon-si (KR); Kawon Cheon, Suwon-si (KR); Seokyoung Kang, Suwon-si (KR); Jinseon Yoo, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 341 days.

(21) Appl. No.: 17/942,652

(22) Filed: Sep. 12, 2022

(65) Prior Publication Data

US 2023/0004735 A1    Jan. 5, 2023

Related U.S. Application Data

(63) Continuation of application No. PCT/KR2022/002756, filed on Feb. 25, 2022.

(30) Foreign Application Priority Data

May 13, 2021 (KR) .................. 10-2021-0062199
Jun. 15, 2021 (KR) .................. 10-2021-0077506

(51) Int. Cl.
*H04N 21/422* (2011.01)
*G06K 7/10* (2006.01)
(Continued)

(52) U.S. Cl.
CPC ... *G06K 7/10306* (2013.01); *H04N 21/43637* (2013.01)

(58) Field of Classification Search
None
See application file for complete search history.

(56) References Cited

U.S. PATENT DOCUMENTS

| 8,752,110 B2 * | 6/2014 | Mukerji | ............ H04N 21/4627 |
| | | | 725/100 |
| 2011/0060652 A1 * | 3/2011 | Morton | .................. H04L 67/02 |
| | | | 705/14.58 |

(Continued)

FOREIGN PATENT DOCUMENTS

| CN | 108121756 A | * | 6/2018 | ........... G06F 16/437 |
| CN | 108353203 A | * | 7/2018 | ............. G08C 17/00 |

(Continued)

OTHER PUBLICATIONS

Extended European Search Report corresponding to Application No. EP22807588.3, Issued date Jun. 5, 2024.

(Continued)

*Primary Examiner* — Mohammed Rachedine
(74) *Attorney, Agent, or Firm* — CANTOR COLBURN LLP

(57) ABSTRACT

An electronic device according to an embodiment disclosed in the disclosure may include an ultra-wideband (UWB) communication module, a communication module, and a processor operatively connected with the UWB communication module and the communication module. The processor may determine a position of the electronic device based on a UWB, may determine an area where the electronic device is positioned, may play a multimedia content corresponding to the area, may acquire interest information regarding a plurality of multimedia contents including the multimedia content, may select at least one multimedia content from the plurality of multimedia contents based on the interest information, may generate a user multimedia content by using the at least one selected multimedia con- (Continued)

tent, and may transmit the user multimedia content to a server through the communication module.

26 Claims, 16 Drawing Sheets

(51) Int. Cl.
| | |
|---|---|
| *G06Q 50/10* | (2012.01) |
| *H04N 21/2743* | (2011.01) |
| *H04N 21/414* | (2011.01) |
| *H04N 21/4363* | (2011.01) |
| *H04N 21/45* | (2011.01) |
| *H04N 21/458* | (2011.01) |
| *H04N 21/81* | (2011.01) |
| *H04N 21/8549* | (2011.01) |

(56) References Cited

U.S. PATENT DOCUMENTS

| | | | |
|---|---|---|---|
| 2014/0337749 A1* | 11/2014 | Phang | H04N 21/4886 715/740 |
| 2015/0381543 A1 | 12/2015 | Hong et al. | |
| 2016/0001712 A1* | 1/2016 | Hsu | H04N 21/44008 725/75 |
| 2016/0044480 A1 | 2/2016 | Hong et al. | |
| 2019/0007093 A1 | 1/2019 | Hammerschmidt et al. | |
| 2020/0319835 A1* | 10/2020 | Bae | G06F 3/1423 |
| 2020/0320577 A1 | 10/2020 | Soule et al. | |
| 2021/0042078 A1* | 2/2021 | Alameh | G06F 3/167 |
| 2021/0056758 A1 | 2/2021 | Yerli | |

FOREIGN PATENT DOCUMENTS

| | | | | |
|---|---|---|---|---|
| CN | 105637888 B | * | 6/2019 | ......... H04L 12/2809 |
| CN | 111757152 A | * | 10/2020 | ......... H04N 21/2541 |
| JP | 2020071046 A | | 5/2020 | |
| JP | 2021036422 A | | 3/2021 | |
| KR | 101253716 B1 | | 4/2013 | |
| KR | 101788143 B1 | | 10/2017 | |
| KR | 20190004240 A | | 1/2019 | |
| KR | 20190032791 A | | 3/2019 | |
| KR | 101972374 B1 | | 4/2019 | |
| KR | 20200064036 A | | 6/2020 | |
| KR | 102141362 B1 | | 8/2020 | |
| KR | 102184311 B1 | | 11/2020 | |

OTHER PUBLICATIONS

International Search Report and Written Opinion for International Application No. PCT/KR2022/002756; International Filing Date Feb. 25, 2022; Date of Mailing Jun. 20, 2022; 7 Pages.

* cited by examiner

METHOD AND ELECTRONIC DEVICE FOR SHARING CONTENT

CROSS-REFERENCE TO RELATED APPLICATIONS

This application is based on and claims priority under 35 U.S.C. § 120 to PCT International Application No. PCT/KR2022/002756, which was filed on Feb. 25, 2022, and claims priority to Korean Patent Application No. No. 10-2021-0077506 filed on Jun. 15, 2021, and Korean Patent Application No. 10-2021-0062199 filed on May 13, 2021, in the Korean Intellectual Property Office, the disclosure of which are incorporated by reference herein their entirety.

TECHNICAL FIELD

Various embodiments disclosed in the present document relate to a method for sharing with another electronic device a content which is based on experiences that a user gets by using an electronic device in a space in which an ultra-wideband (UWB) environment is established, and an electronic device therefor.

BACKGROUND ART

While moving in a space in which a UWB environment is established, a user may experience various contents provided in the space by utilizing an electronic device (for example, a smartphone). For example, a user may appreciate exhibition works exhibited in an art gallery by utilizing an electronic device, while moving in the art gallery in which a UWB environment is established. The electronic device may display an image or a video related to an exhibition work through a display, and may output an explanation regarding the exhibition work through a speaker. In another example, a user may get information regarding products sold in a brand shop by utilizing an electronic device while moving in the brand shop in which a UWB environment is established.

In order for a user to experience various contents by utilizing an electronic device in a space in which a UWB environment is established, it may be useful to determine a position of the electronic device, and UWB may be utilized to precisely measure a position of the electronic device. A UWB anchor and a UWB communication module may be used to measure the position of the electronic device by utilizing UWB, and the electronic device may measure the position of the electronic device, based on a UWB signal exchanged therebetween.

DISCLOSURE

Technical Problem

In some cases, a user may temporarily use (e.g., rent) an electronic device. For example, some spaces (e.g., venues) provide for renting or borrowing an electronic device to use while in the space. A user may get various experiences by using an electronic device that the user borrows or rents for a predetermined time in a space in which a UWB environment is established. Information related to various experiences that the user gets by utilizing the borrowed or rented electronic device may not be provided to a user's personal electronic device, and may be lost after a single use.

Various embodiments disclosed in the present document include a method for generating new content by using information that is not provided to a user's personal terminal and is lost after single use, and providing the generated content to the user's personal electronic device, and an electronic device therefor.

Technical Solution

An electronic device according to an embodiment disclosed in the disclosure may include a UWB communication module, a communication module, and a processor operatively connected with the UWB communication module and the communication module. The processor may determine a position of the electronic device based on a UWB signal received through the UWB communication module, may determine an area where the electronic device is positioned among the plurality of areas, based on a result of comparing the determined position and map information defining a plurality of areas included in a space where an external device transmitting the UWB signal is installed, may play a multimedia content corresponding to the determined area, may acquire interest information regarding a plurality of multimedia contents including the multimedia content played by the electronic device, may select at least one multimedia content from the plurality of multimedia contents based on the interest information, may generate a user multimedia content by using the at least one selected multimedia content, and may transmit the generated user multimedia content to a server through the communication module.

An operating method of an electronic device according to an embodiment disclosed in the disclosure may include: determining a position of the electronic device based on a UWB signal received through a UWB communication module of the electronic device; based on a result of comparing the determined position and map information defining a plurality of areas included in a space where an external device transmitting the UWB signal is installed, determining an area where the electronic device is positioned among the plurality of areas; playing a multimedia content corresponding to the determined area; acquiring interest information regarding a plurality of multimedia contents including the multimedia content played by the electronic device; selecting at least one multimedia content from the plurality of multimedia contents based on the interest information; generating a user multimedia content by using the at least one selected multimedia content; and transmitting the generated user multimedia content to a server through a communication module of the electronic device.

A system according to an embodiment disclosed in the disclosure may include an electronic device, a server, and another electronic device. The electronic device of the system may determine a position of the electronic device based on a UWB signal received through a UWB communication module included in the electronic device, based on a result of comparing the determined position and map information defining a plurality of areas included in a space where an external device transmitting the UWB signal is installed, may determine an area where the electronic device is positioned among the plurality of areas, may play (which may include playing for a first time or an additional time subsequent to the first time) a multimedia content corresponding to the determined area, may acquire interest information regarding a plurality of multimedia contents including the multimedia content played by the electronic device, may select at least one multimedia content from the plurality of multimedia contents based on the interest information, may generate a user multimedia content by using the at least one selected multimedia content, and may transmit the generated user multimedia content to a server through a communication module. The server of the system may store the user multimedia content received from the electronic device, and may transmit link information of the user multimedia content to the electronic device. The electronic device of the system may transmit the link information received from the server to another electronic device. Another electronic device of the system may download a user multimedia content corresponding to the link information received from the electronic device from the server.

Advantageous Effects

A user may have various experiences by utilizing an electronic device that the user rents in a specific space where a UWB environment is established, and information related to the various experiences may be transmitted from the borrowed or rented electronic device to a user's personal electronic device.

The user personal electronic device receives information related to the various experiences, so that the user may use personalized information related to the various experiences even when the user is not in the specific space where the UWB environment is established, and may experience a user customized content or advertisement.

Other various effects that may be directly or indirectly grasped through the present document may be provided.

DESCRIPTION OF DRAWINGS

The above and other advantages and features of this disclosure will become more apparent by describing in further detail embodiments thereof with reference to the accompanying drawings, in which.

Regarding explanation of the drawings, the same or similar reference numerals are used for the same or similar components.

MODE FOR INVENTION

Figure 1:
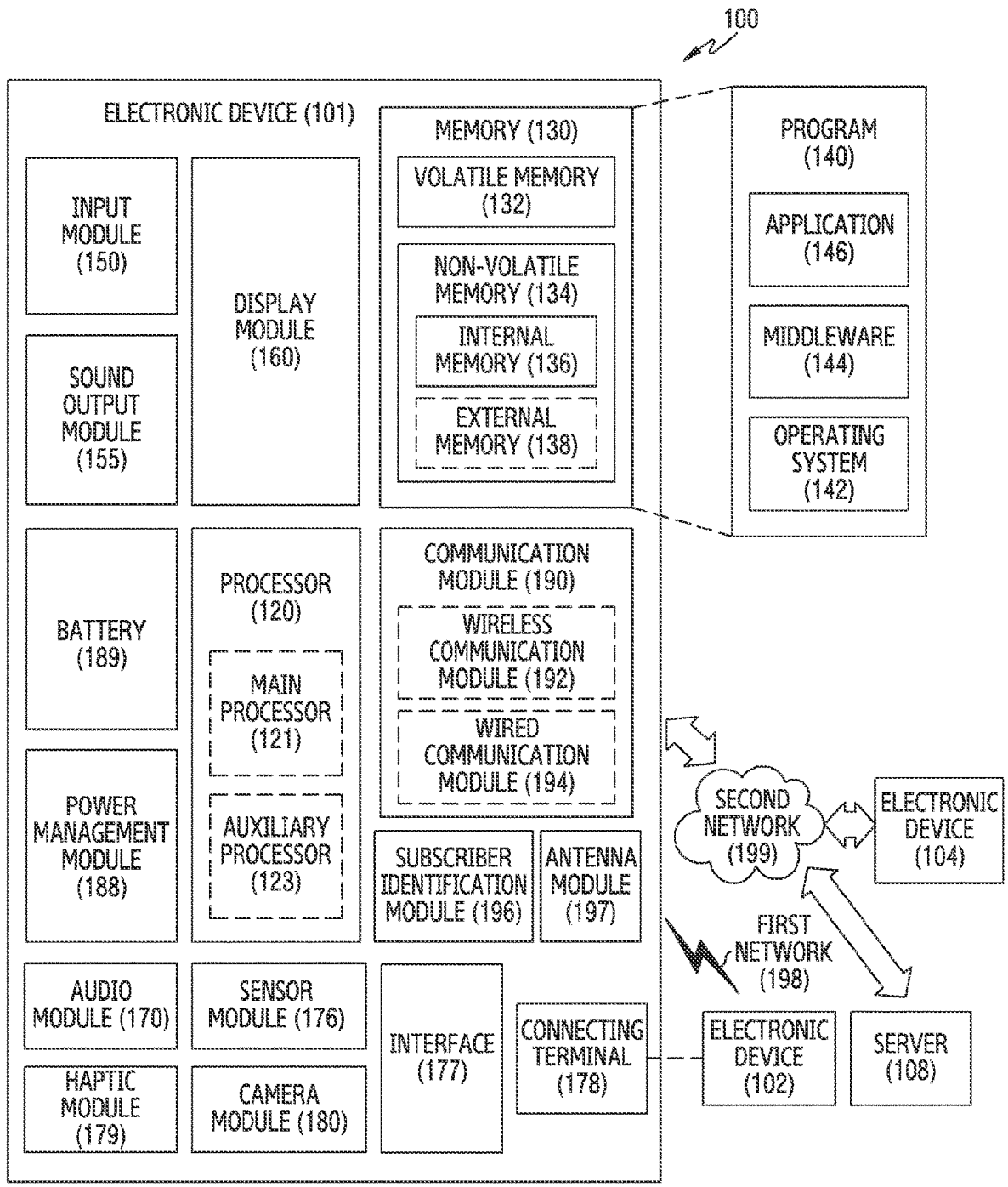
FIG. 1 is a block diagram of an electronic device in a network environment according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, various embodiments will be described with reference to the accompanying drawings. However, these do not limit the disclosure to a specific embodiment, and should be understood as including various modifications, equivalents, and/or alternatives of embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), and/or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In some embodiments, at least one of the components (e.g., the connecting terminal 178) may be omitted from the electronic device 101, and/or one or more other components may be added in the electronic device 101. In some embodiments, some of the components (e.g., the sensor module 176, the camera module 180, and/or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wired) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wired) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., substantially Gbps or more) for implementing eMBB, loss coverage (e.g., substantially 164 dB or less) for implementing mMTC, or U-plane latency (e.g., substantially 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wired), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
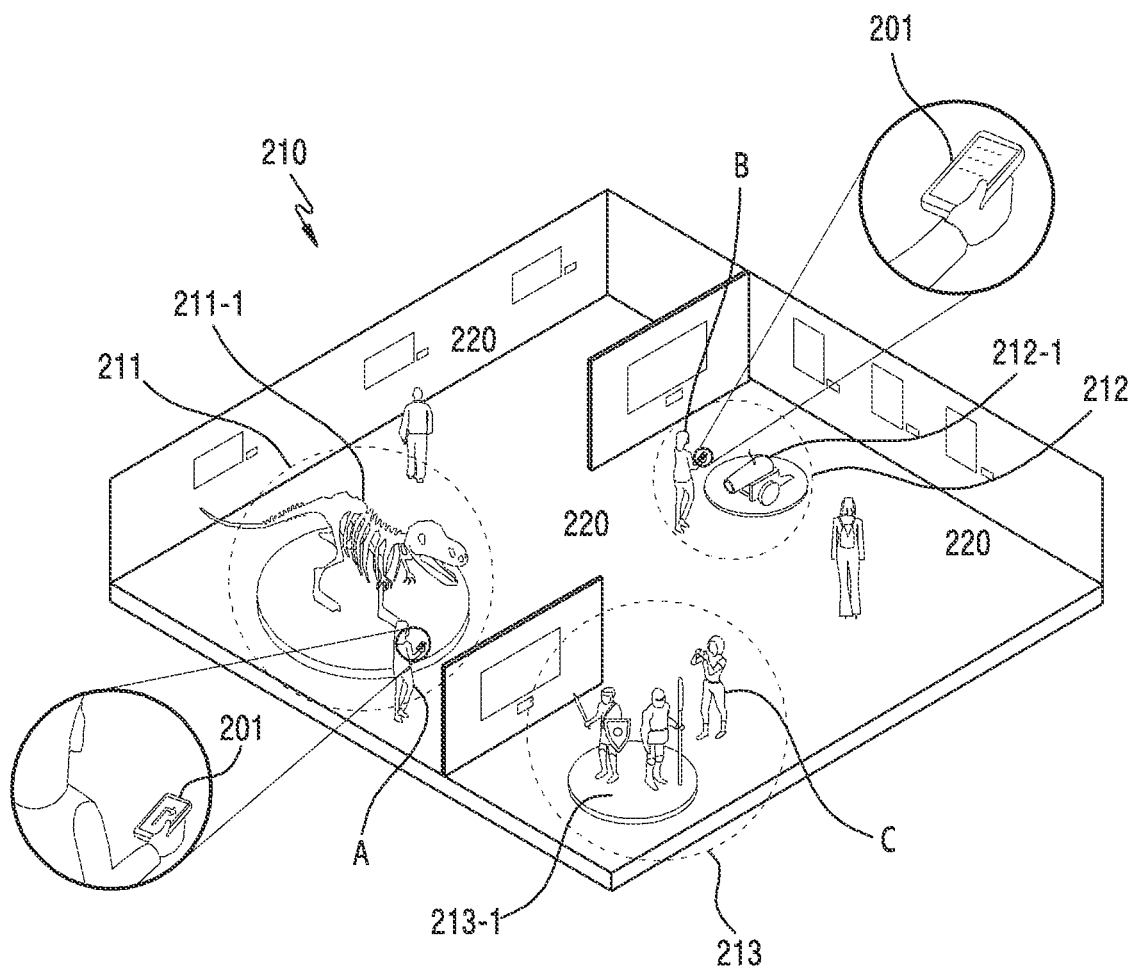
FIG. 2 is a view illustrating a space in which a system for measuring a position of an electronic device by using UWB is established according to an embodiment.

FIG. 2 illustrates a space 210 in which a system for measuring a position of an electronic device 201 by using UWB is established according to an embodiment.

Referring to FIG. 2, the electronic device 201 may be moved by a user (for example, a user A or a user B) in the space 210. The user (for example, the user A or the user B) of the electronic device 201 may experience contents corresponding to objects (for example, a first object 211-1, a second object 212-1, a third object 213-1) positioned in the space 210 while moving in the space 210, in which the system for measuring a position of the electronic device 201 (or the user of the electronic device 201) by using UWB is established. For example, the user may experience contents (for example, multimedia contents) corresponding to exhibition works exhibited in an exhibition hall while moving in the exhibition hall in which a position of the electronic device 201 (or the user of the electronic device 201) may be measured by using UWB. In the disclosure, it is assumed that the user moves in the space 210 while carrying the electronic device 201 and thus it may be deemed that the position of the electronic device 201 and the position of the user are substantially the same as each other.

According to an embodiment, an indoor positioning system for measuring the position of the electronic device 201 by using UWB may include a plurality of UWB anchors (not shown), a UWB communication module (for example, a UWB communication module 320 of FIG. 3), and a server (not shown) (for example, a server 401 of FIG. 4) which provides an indoor positioning solution. The indoor positioning system may not be limited to the above-described components. The electronic device 201 including the UWB communication module may be understood as a target to be positioned by using UWB.

According to an embodiment, the plurality of UWB anchors may be installed in the space 210 as illustrated in FIG. 2 or as otherwise may be suitable. The plurality of UWB anchors may exchange UWB signals with the UWB communication module (for example, the UWB communication module 320 of FIG. 3) of the electronic device 201. The plurality of UWB anchors may provide information related to the position of the electronic device 201 to the server (for example, the server 401 of FIG. 4), which provides the indoor positioning solution, based on the exchanged UWB signals. The information related to the position of the electronic device 201 may include coordinates information corresponding to the position of the electronic device 201. The plurality of UWB anchors may be wired or wirelessly connected with the server, and may provide the information related to the position of the electronic device 201 to the server wired or wirelessly.

According to an embodiment, the server may determine the position of the electronic device 201 and/or an area where the electronic device 201 is positioned, by comparing the information related to the position of the electronic device 201, received from the plurality of UWB anchors, with map information on the space 210. The server may transmit information regarding the determined position of the electronic device 201 and/or the area where the electronic device 201 is positioned to the electronic device 201.

According to an embodiment, the electronic device 201 may play (which may include playing for a first time or an additional time subsequent to the first time) a multimedia content corresponding to the area where the electronic device 201 is positioned among a plurality of areas included in the space 210, based on the information regarding the position of the electronic device 201 and/or the area where the electronic device 201 is positioned, which is received from the server. For example, the user A holding the electronic device 201 may move inside the space 210, and based on the information regarding the position of the electronic device 201 and/or the area where the electronic device 201 is positioned, received from the server, the electronic device 201 may play (which may include playing for a first time or an additional time subsequent to the first time) a first multimedia content corresponding to a first area 211 where the electronic device 201 (or the user A) is positioned. The first multimedia content may be understood as a content including information regarding the object 211-1 included in the first area 211. In another example, the user B holding the electronic device 201 may move inside the space 210, and, based on the information regarding the position of the electronic device 201 and/or the information regarding the area where the electronic device 201 is positioned, received from the server, the electronic device 201 may play (which may include playing for a first time or an additional time subsequent to the first time) a second multimedia content corresponding to a second area 212 where the electronic device 201 (or the user B) is positioned. The second multimedia content may be understood as a content including information regarding the object 212-1 included in the second area 212. In another example, a user C holding the electronic device 201 may move inside the space 210, and, based on the information regarding the position of the electronic device 201 and/or the information regarding the area where the electronic device 201 is positioned, received from the server, the electronic device 201 may play (which may include playing for a first time or an additional time subsequent to the first time) a third multimedia content corresponding to a third area 213 where the electronic device 201 (or the user C) is positioned. The third multimedia content may be understood as a content including information regarding the object 213-1 included in the third area 213. The multimedia content (for example, the first multimedia content, the second multimedia content, the third multimedia content) may include a voice, a text, an image, augmented reality (AR), and/or a video content or the like.

According to an embodiment, the electronic device 201 may acquire a user input related to an object (for example, the first object 211-1, the second object 212-1, the third object 213-1) or a multimedia content corresponding to the object. For example, the electronic device 201 may acquire a user input of the user C to photograph the object 213-1 included in the third area 213. The user input related to the object or the multimedia content corresponding to the object may be understood as interaction information for evaluating a degree of user's interest in the object. The interaction information may include information on whether photographing is performed, whether the user has experience in AR, whether there are an operation and an input by the user, a time, the number of times.

According to an embodiment, the electronic device 201 may be referred to as at least one mobile terminal device including the UWB communication module 320 among a smartphone, a smart pad, a smart note, a smart tag, or a smart gear. The electronic device 201 is not limited to the above-described example, and may include a communication device that may exchange UWB signals with the plurality of UWB anchors by using the UWB communication module 320, and may perform communication with the server.

Figure 3:
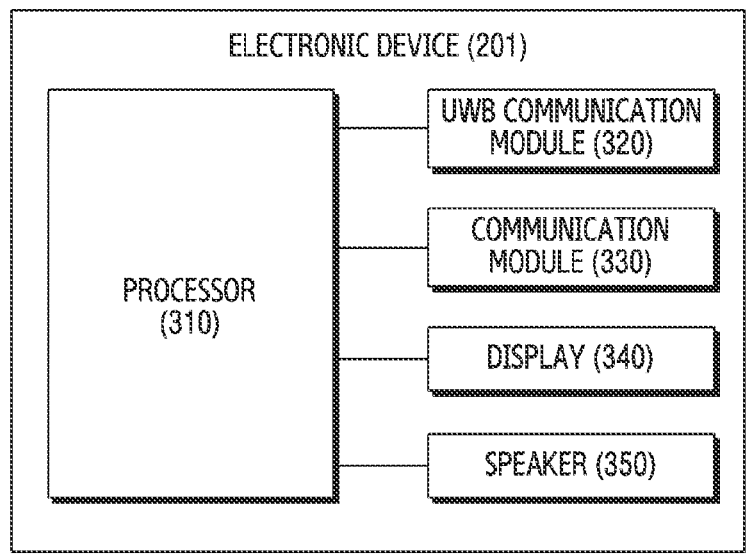
FIG. 3 is a block diagram of an electronic device according to an embodiment.

FIG. 3 is a block diagram of the electronic device 201 according to an embodiment.

Referring to FIG. 3, the electronic device 201 may include a processor 310, a UWB communication module 320, a communication module 330, a display 340, and a speaker 350. Components included in the electronic device 201 may not be limited to the components illustrated in FIG. 3 (for example, the processor 310, the UWB communication module 320, the communication module 330, the display 340, and the speaker 350). The components of the electronic device 201 illustrated in FIG. 3 may be substituted with other components, or additional components may be added to the electronic device 201. For example, a part of the descriptions of the electronic device 101 of FIG. 1 may be applied to the electronic device 201 of FIG. 3. In another example, the electronic device 201 may further include a memory, at least one sensor (for example, a proximity sensor, a geomagnetic sensor, an illuminance sensor, an IR sensor, a gyro sensor) and/or a camera.

According to an embodiment, the processor 310 may execute instructions stored in the memory to control operations of the components of the electronic device 201 (for example, the UWB communication module 320, the communication module 330, the display 340, and the speaker 350). The processor 310 may be electrically and/or operatively connected with the UWB communication module 320, the communication module 330, the display 340, and the speaker 350. The processor 310 may execute software to control at least one other component (for example, the UWB communication module 320, the communication module 330, the display 340, and the speaker 350) connected to the processor 310. The processor 310 may acquire a command from the components included in the electronic device 201, and may interpret the acquired command, and may process and/or compute various data according to the interpreted command.

According to an embodiment, the UWB communication module 320 may support performance of communication between the electronic device 201 and an external device (for example, the server 401) by transmitting or receiving UWB signals. The UWB communication module 320 may support performance of communication with the electronic device 201 by using an ultrawide band frequency of substantially 500 MHz or higher. The electronic device 201 may exchange ultrawide band signals (for example, UWB signals) with the UWB anchors installed in the space 210 through the UWB communication module 320.

According to an embodiment, the communication module 330 may support performance of communication between the electronic device 201 (for example, a smartphone) and an external device (for example, the server 401 or another electronic device 230) by using wired communication or wireless communication (for example, Bluetooth (BT), Bluetooth low energy (BLE), Wi-Fi). For example, the electronic device 201 may transmit a multimedia content to the server 401 through the communication module 330. In another example, the electronic device 201 may receive link information regarding the multimedia content from the server 401 through the communication module 330. In another example, the electronic device 201 may transmit the link information regarding the multimedia content to another electronic device 230 through the communication module 330.

According to an embodiment, the display 340 may visually display (provide or output) a content. For example, the display 340 may visually display a multimedia content (for example, a content in the form of a text, an image and/or a video). In another example, the display 340 may display a user interface (UI) related to the link information regarding the multimedia content. The UI related to the link information may include a QR code or URL information.

According to an embodiment, the display 340 may include a deformable display that has flexibility to be flexible, foldable, bendable, rollable or stretchable. For example, the display 340 may include a flexible display, a foldable display, or a stretchable display.

According to an embodiment, the display 340 may include at least one sensor. For example, the display 340 may include a touch sensor or a pressure sensor. The electronic device 201 may acquire a user input (for example, a touch input) by using the touch sensor through the display 340.

According to an embodiment, the speaker 350 may output an audio or a sound corresponding to audio data. For example, the electronic device 201 may output an audio or a sound corresponding to audio data of a multimedia content through the speaker 350.

Figure 4:
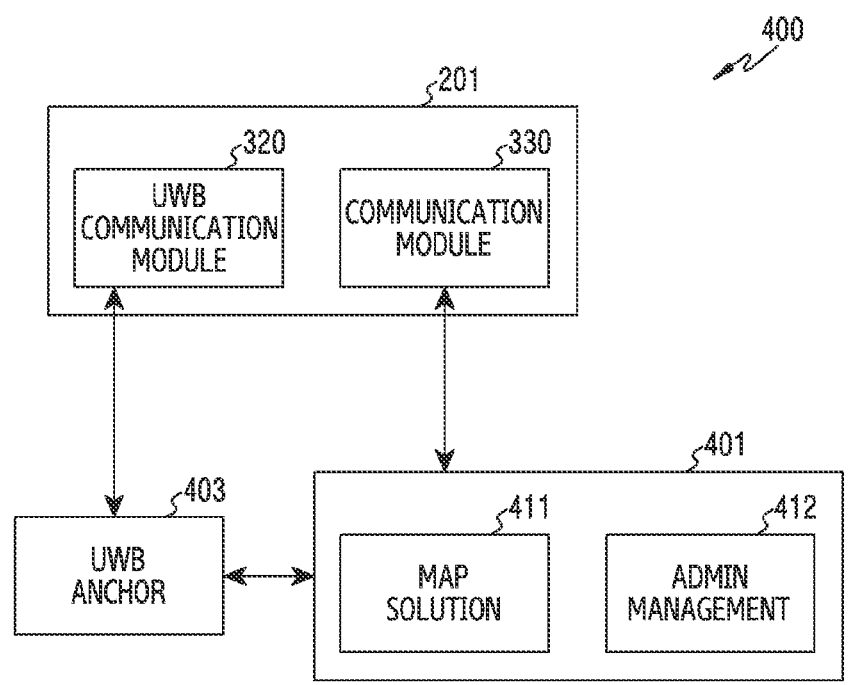
FIG. 4 is a view illustrating an indoor positioning system according to an embodiment.

FIG. 4 illustrates an indoor positioning system 400 according to an embodiment.

Referring to FIG. 4, the indoor positioning system 400 may include an electronic device 201, a server 401, and a UWB anchor 403. The components of the indoor positioning system 400 are not limited to the above-described example.

According to an embodiment, the electronic device 201 may exchange UWB signals with the UWB anchor 403 through the UWB communication module 320. UWB refers to short-range wireless communication technology that uses a wideband frequency of substantially 500 MHz or higher and may measure a distance by using a pulse of about 2 nano second length.

According to an embodiment, the UWB anchor 403 may determine a distance between the UWB anchor 403 and the electronic device 201, based on UWB signals exchanged with the electronic device 201. The UWB anchor 403 may transmit information regarding the determined distance to the server 401.

According to an embodiment, the server 401 may provide an indoor positioning solution by using UWB. The server 401 may receive the information regarding the distance from the UWB anchor 403. The server 410 may receive information regarding respective distances between the electronic device 201 and the plurality of UWB anchors from the plurality of UWB anchors although this is not illustrated in FIG. 4. The server 401 may determine an area (for example, the first area 211, the second area 212, the third area 213 of FIG. 2) in the space 210 where the electronic device 201 is positioned, based on a result of comparing the information regarding the distance and map information provided by a MAP solution 411. The map information provided by the MAP solution 411 may include map information that defines the plurality of areas included in the space 210.

According to an embodiment, the server 401 may provide a multimedia content corresponding to the determined area where the electronic device 201 is positioned to the electronic device 201. For example, when the electronic device 201 is positioned in a first area (for example, the first area 211 of FIG. 2), the server 401 may transmit a first multimedia content corresponding to the first area 211 to the electronic device 201. In another example, when the electronic device 201 is positioned in a second area (for example, the second area 212 of FIG. 2) or a third area (for example, the third area 213 of FIG. 2), the server 401 may transmit a second multimedia content or a third multimedia content to the electronic device 201, respectively.

According to an embodiment, the electronic device 201 may play (which may include playing for a first time or an additional time subsequent to the first time) the multimedia content received from the server 401. For example, the electronic device 201 may display visual information (for example, a text, an image, a video) regarding the multimedia content through the display 340, and may output auditory information (for example, a guide voice) regarding the multimedia content through the speaker 350. For example, the electronic device 201 may display information (for example, an image of a work, an explanation on a work) regarding an exhibition work exhibited in an exhibition hall through the display 340, and may output information (for example, a guide voice) regarding the exhibition work in an audio form through the speaker 350.

According to an embodiment, an ADMIN management 412 may provide a function of controlling settings related to the multimedia content provided to the electronic device 201 from the server 401 or map information regarding the space 210. For example, the ADMIN management 412 may provide a function of enabling an administrator to determine a type of a multimedia content corresponding to an area where the electronic device 201 is positioned, and may provide a function of enabling the administrator to determine whether to automatically or manually change the multimedia content to another multimedia content according to a changed position of the electronic device 201.

Figure 5:
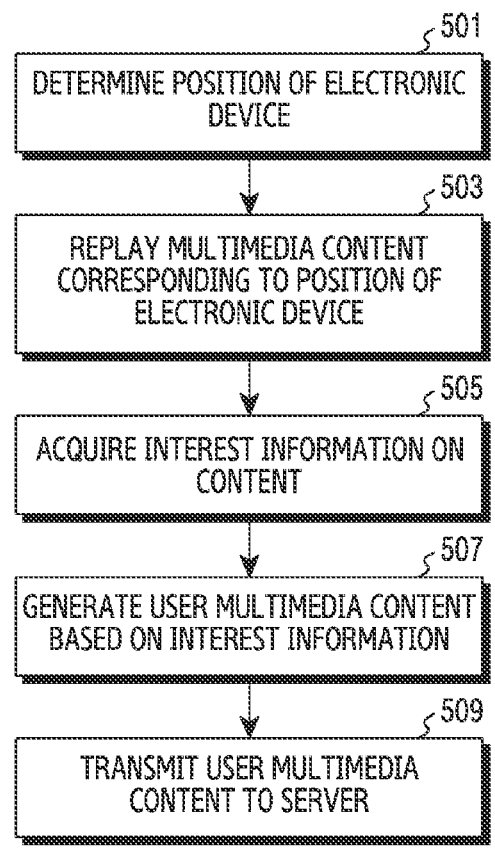
FIG. 5 is a flowchart of operations for transmitting, by an electronic device, a user multimedia content to a server according to an embodiment.

FIG. 5 illustrates a flowchart of operations for transmitting, by the electronic device 201, a user multimedia content to the server 401 according to an embodiment.

A series of operations explained hereinbelow may be performed by the electronic device 201 simultaneously or may be performed in a different order, or some operations may be omitted or added.

In operation 501, the electronic device 201 may determine a position of the electronic device 201, based on UWB signals exchanged with a UWB anchor (for example, the UWB anchor 403 of FIG. 4, which is an example of one of the plurality of UWB anchors of FIG. 2) through the UWB communication module 320. While the electronic device 201 is positioned in the space 210 where the UWB anchor 403 is installed, the electronic device 201 may exchange UWB signals with the UWB anchor 403 through the UWB communication module 320. The UWB anchor 403 may determine a distance between the electronic device 201 and the UWB anchor 403, based on a UWB signal received from the electronic device 201. The UWB anchor 403 may transmit information regarding the determined distance between the electronic device 201 and the UWB anchor 403 to the server 401. The server 401 may receive information regarding respective distances between the electronic device 201 and the plurality of UWB anchors from the plurality of UWB anchors including the UWB anchor 403. The server 401 may determine the position of the electronic device 201 by using the information regarding the distances. The server 401 may determine the position of the electronic device 201 in real time and may update. The server 401 may determine an area in the space 210 where the electronic device 201 is positioned, based on the determined position of the electronic device 201 and map information provided by the MAP solution 411. The server 401 may transmit information regarding the position of the electronic device 201 or the area in the space 210 where the electronic device 201 is positioned to the electronic device 201.

According to an embodiment, the electronic device 201 may determine the position of the electronic device 201 by using at least one of the UWB communication module 320, at least one sensor or camera. The at least one sensor may include a proximity sensor, a geomagnetic sensor, an illuminance sensor, or an IR sensor.

According to an embodiment, the electronic device 201 may receive, from the server 401, the information regarding the distance between the electronic device 201 and the UWB anchor 403, and map information regarding the space 210. The electronic device 201 may determine the position of the electronic device 201, based on the received information regarding the distance. The electronic device 201 may determine an area where the electronic device 201 is positioned, based on a result of comparing the position and the map information. The electronic device 201 may determine the position of the electronic device 201 and the area where the electronic device 201 is positioned in real time.

In operation 503, the electronic device 201 may play (which may include playing for a first time or an additional time subsequent to the first time) a multimedia content corresponding to the area where the electronic device 201 is positioned. For example, when the electronic device 201 is positioned in a first area (for example, the first area 211 of FIG. 2), the electronic device 201 may play a first multimedia content corresponding to the first area.

In operation 505, the electronic device 201 may acquire interest information corresponding to an element for determining a degree of interest in contents played by the electronic device 201. According to table 1 presented below, the interest information may include user position information, content play information, and interaction information. For example, the interest information may include first information regarding a time during which the electronic device 201 stays in a certain area, second (play) information related to the play of the contents, and/or third information related to a user's interactions on the contents.

TABLE 1

| Types of interest information | Details |
| --- | --- |
| User position information | Information regarding a time during which a user stays in an area, based on a time at which the user enters the area and a time at which the user leaves from the area |
| Content play information | Information regarding whether a content is played and a play time, ranking applied by substituting with play % |

TABLE 1-continued

| Types of interest information | Details |
|---|---|
| Interaction information | Information regarding whether photographing is performed, information regarding whether a user has experience in AR, information regarding whether a user interaction is manipulated, a manipulation time, and number of manipulations |

According to an embodiment, the position information of the user may be understood as being substantially the same as the position information of the electronic device 201. According to an embodiment, the electronic device 201 may determine a degree of user's interest in the multimedia contents played by the electronic device 201, based on the interest information. For example, the electronic device 201 may measure a time during which the user stays in the specific area, by measuring a time at which the user enters the specific area and a time at which the user leaves therefrom. The electronic device 201 may determine that the longer the user stays, the higher the degree of user's interest in the multimedia content corresponding the specific area is. According to an embodiment, the electronic device 201 may determine that a played multimedia content has a higher degree of user interest than a non-played multimedia content. According to an embodiment, the electronic device 201 may determine a multimedia content having a long play time or a high play percentage as a multimedia content of a high degree of user interest. According to an embodiment, the electronic device 201 may determine a multimedia content on which an interaction is performed as a multimedia content of a high degree of user interest. The electronic device 201 may determine a multimedia content on which an interaction is performed for a long time (e.g., relative to another interaction) or on which a manipulation is performed multiple times, as a multimedia content of a high degree of user interest.

According to an embodiment, the electronic device 201 may determine a first time at which the electronic device 201 enters a certain area (for example, the first area 211, the second area 212, the third area 213) included in the space 210, and a second time at which the electronic device leaves therefrom, based on the position of the electronic device 201 which is determined in real time or near real time. The electronic device 201 may determine a time (referred to a "staying time") during which the electronic device 201 stays in the certain area, based on a difference between the first time and the second time. The electronic device 201 may determine a degree of user's interest in an object included in the certain area or a multimedia content corresponding to the object, based on the determined staying time. The degree of user's interest in the object positioned in the certain area and the multimedia content corresponding to the object may be proportional to the time during which the electronic device 201 stays in the certain area. For example, when a time during which the electronic device 201 stays in the first area 211 is longer than a time during which the electronic device 201 stays in the second area 212, the electronic device 201 may determine that a degree of user's interest in the object included in the first area 211 is higher than a degree of user's interest in the object included in the second area 212.

According to an embodiment, the play information may include information regarding whether multimedia contents corresponding to the plurality of areas included in the space 210 are played, a play time, and information on a ratio of an actual play time (i.e., how long the play was viewed) to a total play time (i.e., a total duration of the multimedia content being played).

According to an embodiment, the electronic device 201 may determine a degree of user's interest in the object included in the certain area or the content corresponding to the object, based on the play information. The electronic device 201 may determine that a degree of user's interest in a played content is higher than a degree of user's interest in a non-played content. Similarly, the electronic device 201 may determine that a degree of user's interest in a content played multiple times is higher than a degree of user's interest in a non-played content or content played once. The electronic device 201 may determine that a degree of user's interest in a content having a long play time is higher than a degree of user's interest in a content having a short play time. The electronic device 201 may determine that a ratio of an actual play time to a total play time of a content is proportional to a degree of user's interest in the content. For example, the electronic device 201 may determine that a degree of user's interest in a content having a high ratio of an actual play time to a total play time of a content is higher than a degree of user's interest in a content having a small ratio.

According to an embodiment, the user's interaction may refer to various actions of the user related to the contents or the objects corresponding to the contents. For example, the interaction may include searching a multimedia content regarding the object (for example, the first object 211-1, the second object 212-1, the third object 213-1 of FIG. 2), photographing the object by a camera (e.g., the camera module 180), or experiencing an augmented reality (AR) content related to the object. Information related to the user's interaction may include information regarding whether the user performs the interaction, a performance time, and/or the number of times of performance.

In operation 507, the electronic device 201 may generate a user multimedia content, based on the interest information. The electronic device 201 may generate the user multimedia content, based on the interest information, in response to a user input on a display (for example, a display 861 of FIG. 8) for generating a user multimedia content being acquired.

Referring to table 2, a method for the electronic device 201 to generate a user multimedia content when there is one space 210 or there are two or more spaces 2 will be described.

TABLE 2

| | When there is one space, | When there are two or more spaces, |
|---|---|---|
| When the number of played multimedia contents is less than a designated number, | a user multimedia content is not generated and play of the multimedia content is recommended. | |
| When the number of played multimedia contents is larger than or equal to the designated number, the number of substantially 100% played multimedia contents is less than the designated number, | the time of the played multimedia content is calculated by percentage and a designated number of high rank multimedia contents are selected. | |

TABLE 2-continued

| | When there is one space, | When there are two or more spaces, |
|---|---|---|
| When the number of substantially 100% played multimedia contents is larger than or equal to the designated number, | a designated number of multimedia contents are randomly selected from the substantially 100% played multimedia contents. | a designated number of multimedia contents including at least one multimedia content in each space are randomly selected. |

According to an embodiment, when the number of multimedia contents played by the electronic device 201 is less than a designated number (for example, 5), the electronic device 201 may omit generation of a user multimedia content regardless of the number of spaces 210, and may display a notification for recommending play of the multimedia content. According to an embodiment, when the number of multimedia contents played by the electronic device 201 is larger than or equal to the designated number, and the number of multimedia contents substantially 100% played (or another suitable threshold play amount, such as substantially 80% played) is less than the designated number, the electronic device 201 may calculate a play time of the played multimedia content by percentage, may select the designated number of multimedia contents, and may generate a user multimedia content by using the selected multimedia contents, regardless of the number of spaces 210. The electronic device 201 may calculate the play time of the multimedia content by percentage by dividing the actual play time of the multimedia content by the total play time. According to an embodiment, when the number of multimedia contents substantially 100% played by the electronic device 201 is larger than or equal to the designated number and there is one space 210, the electronic device 201 may randomly select the designated number of multimedia contents from the substantially 100% played multimedia contents, and may generate a user multimedia content by using the selected multimedia contents. According to an embodiment, when the number of multimedia contents substantially 100% played by the electronic device 201 is larger than or equal to the designated number, and there are two or more spaces 210, the electronic device 201 may select at least one multimedia content in each space. The number of multimedia contents selected in each space may be equal to the designated number.

According to an embodiment, the electronic device 201 may select at least one content from a plurality of contents including the multimedia content played by the electronic device 201, based on the interest information. For example, the electronic device 201 may select contents that have a high degree of user interest as many as a number set by the user (for example, 5) from the played contents, based on the interest information. The electronic device 201 (or another suitable device, such as the server 108, the electronic device 104, etc.) may generate a user multimedia content by using the at least one selected content. The user multimedia content may be understood as a multimedia content. For example, there may exist respective pieces of information corresponding to the contents played by the electronic device 201, and the user multimedia content may be understood as an image or a video content which continuously displays the images. The information may include an image of an object corresponding to the played content, a title, a subtitle, a production date, a position, a time at which the content is played, or a date. According to an embodiment, the electronic device 201 may determine whether to generate a user multimedia content according to the number of contents played by the electronic device 201. For example, when the number of played contents is smaller than a set number (for example, 5), the electronic device 201 may omit generation of the user multimedia content. When the number of played contents is smaller than the set number, the electronic device 201 may display a user interface (for example, a user interface 901a of FIG. 9) displaying guide information indicating that the user multimedia content is not generated, through the display 340. In another example, when the number of played contents is larger than the set number (for example, 5), the electronic device 201 may generate the user multimedia content. When the number of played contents is larger than the set number, the electronic device 201 (or another suitable device, such as the server 108, the electronic device 104, etc.) may generate a user multimedia content which continuously displays images (for example, images displayed on user interfaces 902, 903, 904 of FIG. 9) corresponding to the played contents through the display 340. The electronic device 201 may generate a data file by performing multimedia generation and capturing or recording on the generated user multimedia content.

According to an embodiment, when the number of played contents is larger than the set number (for example, 5), the electronic device 201 may determine a method of selecting at least one content selected to generate the user multimedia content, based on the number of contents actually played as long as the total play time (for example, substantially 100% played contents). For example, when the number of played contents is larger than the set number (for example, 5) and the number of contents actually played as long as the total play time is smaller than the set number (for example, 5), the electronic device 201 may select the set number of contents (for example, 5) having a high play ratio, which is obtained by dividing the play time of the played content by the total play time. The electronic device 201 (or another suitable device, such as the server 108, the electronic device 104, etc.) may generate the user multimedia content by using the set number of contents selected.

According to an embodiment, when the number of played contents is larger than the set number and the number of contents actually played as long as the total play time is larger than the set number, the electronic device 201 may randomly select the set number of contents from the contents actually played as long as the total play time.

According to an embodiment, when the number of played contents is larger than the set number and the number of contents actually played as long as the total play time is larger than the set number, the electronic device 201 may select the set number of contents having a high degree of interest, based on the interest information. The electronic device 201 (or another suitable device, such as the server 108, the electronic device 104, etc.) may generate the user multimedia content by using the selected content.

According to an embodiment, when a place where indoor positioning may be performed by using a UWB method includes a plurality of spaces, for example, when there are a plurality of the spaces 210 shown in FIG. 2, and when the number of contents actually played as long as the total play time is larger than the set number, the electronic device 201 may select at least one of contents corresponding to each of the plurality of spaces, based on the interest information. For example, when the place includes a first space and a second space, the electronic device 201 may select at least one content corresponding to the first space and may select at least one content corresponding to the second space in order to generate the user multimedia content. The sum of the number of contents selected for the plurality of spaces, respectively, may be the same as the set number. For example, when the set number is 5, the electronic device 201 may select three contents corresponding to the first space, and may select two contents corresponding to the second space. The electronic device 201 (or another suitable device, such as the server 108, the electronic device 104, etc.) may generate the user multimedia content by using the selected contents.

According to an embodiment, when the place where indoor positioning may be performed by the UWB method includes the plurality of spaces, and the number of contents played by the electronic device 201 is smaller than the set number (for example, 5), the electronic device 201 may omit generation of the user multimedia content.

According to an embodiment, when the place where indoor positioning may be performed by using the UWB method includes the plurality of spaces, and when the number of played contents is larger than the set number (for example, 5) and the number of contents played as long as the total play time is smaller than the set number, the electronic device 201 may select the set number of contents (for example, 5) having a high play ratio, which is obtained by dividing the play time of the played content by the total play time. The electronic device 201 (or another suitable device, such as the server 108, the electronic device 104, etc.) may generate the user multimedia content by using the selected contents.

In operation 509, the electronic device 201 may transmit the generated user multimedia content to the server 401. For example, the electronic device 201 may generate a data file by performing multimedia generation and capturing or recording with respect to the generated user multimedia content. The electronic device 201 may transmit the generated data file to the server 401.

Figure 6A:
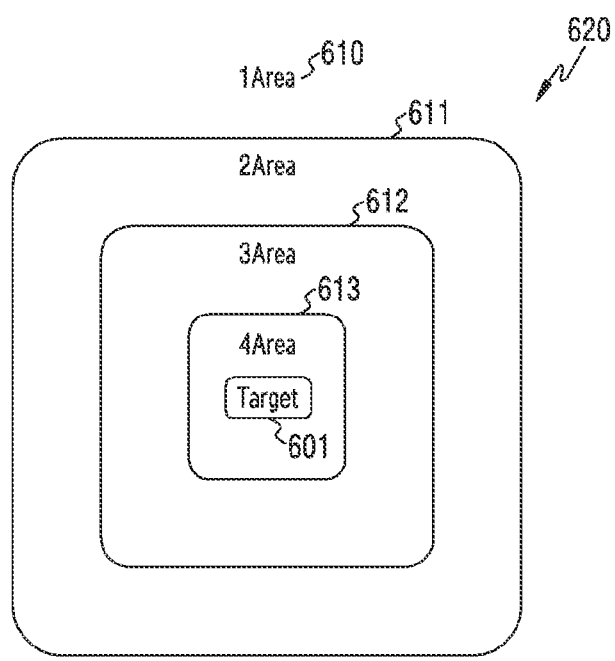
FIG. 6A is a view illustrating a space which includes a plurality of areas according to an embodiment.
Figure 6B:
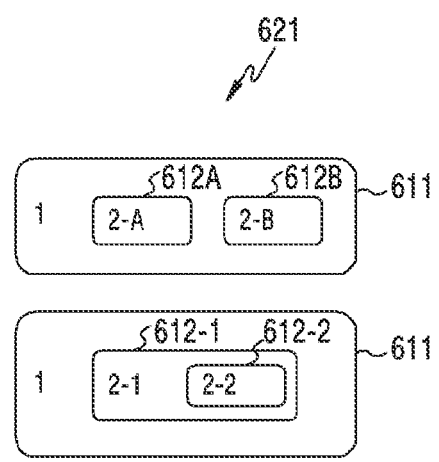
FIG. 6B is a view illustrating a space which includes a plurality of areas according to an embodiment.

FIG. 6A illustrates a space (e.g., the space 210) which includes a plurality of areas according to an embodiment. FIG. 6B illustrates a space (e.g., the space 210) which includes a plurality of areas according to an embodiment.

View 620 of FIG. 6A illustrates areas (for example, a first target area 610, a second target area 611, a third target area 612, a fourth target area 613) divided by a distance from a center of a target 601, and view 621 of FIG. 6B illustrates the third areas which are arranged in the second target area 611 in various methods.

Referring to view 620 of FIG. 6A, the target 601 may exist in a space (for example, the space 210 of FIG. 2) which provides a system capable of measuring a position of the electronic device 201 by using UWB, and may be referred to as an object (for example, the first object 211-1, the second object 212-1, the third object 213-1 of FIG. 2) having a corresponding multimedia content. For example, the target 601 may exist in an exhibition hall which provides the system capable of measuring the position of the electronic device 201 by using UWB, and may be understood as an exhibition work having a corresponding multimedia content. In another example, the target 601 may exist in a brand store which provides the system capable of measuring the position of the electronic device 201 by using UWB, and may be understood as a brand product (for example, clothes, shoes, or bag) having a corresponding multimedia content.

According to an embodiment, the plurality of areas may be determined according to a distance from the target 601, and the distance may be determined according to settings of an administrator.

According to an embodiment, the administrator of the space 210 may determine an area from the target 601 by a first distance as the fourth target area 613 through the ADMIN management 412 of the server 401. For example, the administrator may set the fourth target area 613 such that, when the electronic device 201 is positioned in the fourth target area 613, the electronic device 201 plays a content corresponding to the target 601 or displays a screen displaying detailed explanation information on the target 601. When the electronic device 201 is positioned in the fourth target area 613, the electronic device 201 may play the content corresponding to the target 601 or may display a screen (for example, a fourth user interface 704a and/or a fifth user interface 705a of FIG. 7) displaying detailed explanation information on the target 601.

According to an embodiment, the administrator may determine an area from the target 601 by a second distance from the first distance as the third target area 612. For example, the administrator may set the third target area 612 such that, when the electronic device 201 is positioned in the third target area 612, the electronic device 201 displays a screen displaying the areas (for example, the first area 211, the second area 212, the third area 213 of FIG. 2) of the space 210. When the electronic device 201 is positioned in the third target area 612, the electronic device 201 may display a screen (for example, a third user interface 703a of FIG. 7) displaying the areas of the space 210.

According to an embodiment, the administrator may determine an area from the target 601 by a third distance from the second distance as the second target area 611. For example, the administrator may set the second target area 611 such that, when the electronic device 201 is positioned in the second target area 611, the electronic device 201 displays a screen displaying public information of the space 210. When the electronic device 201 is positioned in the second target area 611, the electronic device 201 may display a screen (for example, a second user interface 702a of FIG. 7) displaying public information of the space 210.

According to an embodiment, the administrator may determine an area from the target 601 by longer than the third distance as the first target area 610. For example, the administrator may set the first target area 610 such that, when the electronic device 201 is positioned in the first target area 610, the electronic device 201 displays a home screen regarding the space 210. When the electronic device 201 is positioned in the first target area 610, the electronic device 201 may display the home screen (for example, a first user interface 701a of FIG. 7) of the space 210.

According to an embodiment, the second distance is longer than the first distance and the third distance may be longer than the second distance.

According to an embodiment, the electronic device 201 may provide a different user interface through the display 340 according to a target area where the electronic device 201 is positioned. This will be described in detail with reference to FIG. 7.

According to an embodiment, when the electronic device 201 is positioned in the fourth target area 613, the electronic device 201 may play a multimedia content corresponding to the target 601.

Referring to view 621 of FIG. 6B, the second target area 611 may include two third target areas 612A, 612B without overlapping, or may include two third target areas 612-1, 612-2 overlapping each other. An arrangement relationship between the target areas is not limited to the shape illustrated in FIG. 6B, and the target areas may be arranged in various shapes.

Figure 7:
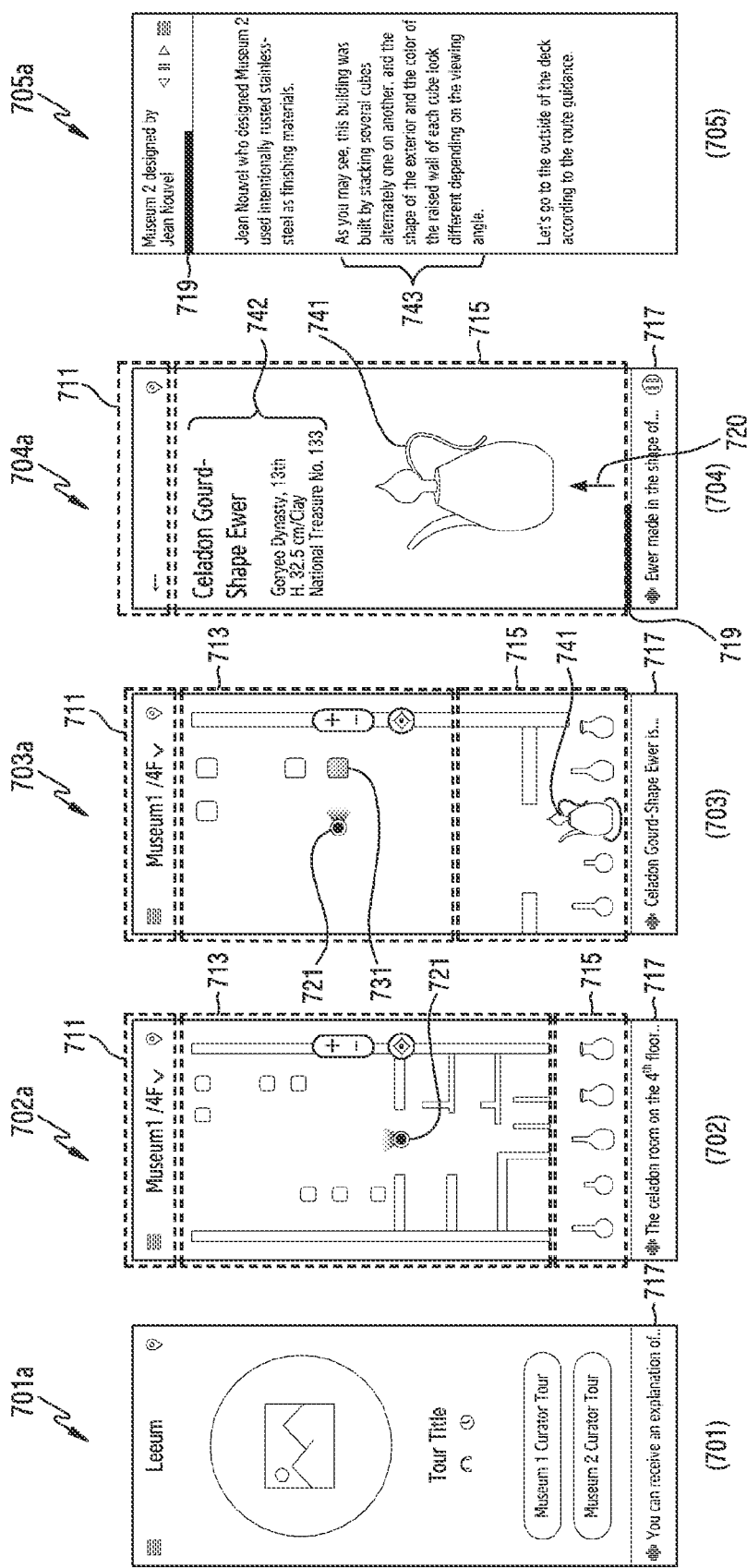
FIG. 7 is a view illustrating user interfaces which are displayed according to a position of an electronic device according to an embodiment.

FIG. 7 illustrates user interfaces which are displayed according to a position of the electronic device 201 according to an embodiment.

Hereinafter, user interfaces displayed in response to the target areas, respectively, when the electronic device 201 is positioned in the target areas shown in view 620 of FIG. 6A will be described.

View 701 of FIG. 7 illustrates a first user interface 701a which is displayed when the electronic device 201 is positioned in the first target area 610 of FIG. 6A. The first user interface 701a may be understood as a basic screen of an application. The application may be understood as an application for providing information regarding a position of the electronic device 201 and a content corresponding to the position.

View 702 of FIG. 7 illustrates a second user interface 702a which is displayed when the electronic device 201 is positioned in the second target area 611 of FIG. 6A or 6B. According to a change of the position of the electronic device 201, the electronic device 201 may change the first user interface 701a to the second user interface 702a, and may display the second user interface. For example, when the position of the electronic device 201 moves from the first target area 610 to the second target area 611 and a designated time (for example, N second) is elapsed, the electronic device 201 may change the first user interface 701a to the second user interface 702a and may display the second user interface.

According to an embodiment, the second user interface 702a may include a first portion 711 displaying information regarding a position of the electronic device 201, a second portion 713 displaying a map displaying a current position 721 of the electronic device 201, a third portion 715 displaying images of objects positioned in the proximity of the electronic device 201 and corresponding to reproducible contents, and a fourth portion 717 displaying a text corresponding to a guide suitable for each step and each context and a played voice.

According to an embodiment, the first portion 711 may display information regarding the position of the electronic device 201 in the form of a text. For example, the first portion 711 may display information indicating that the electronic device 201 is on the fourth floor of an art museum 1.

According to an embodiment, the second portion 713 may display the map displaying the current position 721 of the electronic device 201.

View 703 of FIG. 7 illustrates a third user interface 703a which is displayed when the electronic device 201 is positioned in the third target area 612 of FIG. 6A. According to a change of the position of the electronic device 201, the electronic device 201 may change the second user interface 207 to the third user interface 703a and display the third user interface. For example, when the position of the electronic device 201 moves from the second target area 611 to the third target area 612 and a designated time (for example, N second) is elapsed, the electronic device 201 may change the second user interface 702a to the third user interface 703a and may display the third user interface.

According to an embodiment, the third user interface 703a may include the first portion 711, the second portion 713, the third portion 715, and the fourth portion 717. An area of the second portion 713 included in the third user interface 703a may be smaller than an area of the second portion 713 included in the second user interface 702a. An area of the third portion 715 included in the third user interface 703a may be larger than an area of the third portion 715 included in the second user interface 702a. The third portion 715 included in the third user interface 703a may display images of objects positioned in the proximity of the electronic device 201 and corresponding to reproducible contents. The electronic device 201 may display, on the third portion 715 of the third user interface 703a, an image 741 that corresponds to a closest object 731 among the objects positioned in the proximity of the electronic device 201. The electronic device 201 may display the image 741 corresponding to the object 731 closest to the electronic device 201 to be relatively larger than the images corresponding to the objects.

View 704 of FIG. 7 illustrates a fourth user interface 704a which is displayed when the electronic device 201 is positioned in the fourth target area 613 of FIG. 6A. According to a change of the position of the electronic device 201, the electronic device 201 may change the third user interface 703a to the fourth user interface 704a and display the fourth user interface. For example, when the position of the electronic device 201 moves from the third target area 612 to the fourth target area 613 and a designated time (for example, N second) is elapsed, or in response to a user input to select an image corresponding to the objects positioned in the proximity of the electronic device 201, the electronic device 201 may change the third user interface 703a to the fourth user interface 704a and may display the fourth user interface.

According to an embodiment, the fourth user interface 704a may include the first portion 711, the third portion 715, and the fourth portion 717. The fourth user interface 704a may include the second portion 713 although this is not illustrated, and an area of the second portion 713 included in the fourth user interface 704a may be smaller than the area of the second portion 713 included in the third user interface 703a. The third portion 715 included in the fourth user interface 704a may include the image 741 corresponding the object 731 closest to the electronic device 201 and information 742 (for example, a title and a subtitle) related to the object 731. The fourth user interface 704a may include a play bar 719 indicating a current play point in the total play time of video data of a multimedia content corresponding to the object 731. The fourth user interface 704a may include a display 720 providing a screen displaying detailed explanation information related to the object 731. In response to a drag input moving up from the display 720 on a screen being acquired, the electronic device 201 may display a fifth user interface 705a including the detailed explanation information related to the object 731.

According to an embodiment, the fifth user interface 705a may include a content (for example, a text, an image, a video) displaying the detailed explanation information related to the object 731, and may include the play bar 719 indicating a current play point in the total play time of voice data corresponding to the content. The electronic device 201 may give a visual effect to a text corresponding to the play point displayed on the play bar 719 in the displayed texts, and may display the text.

Figure 8:
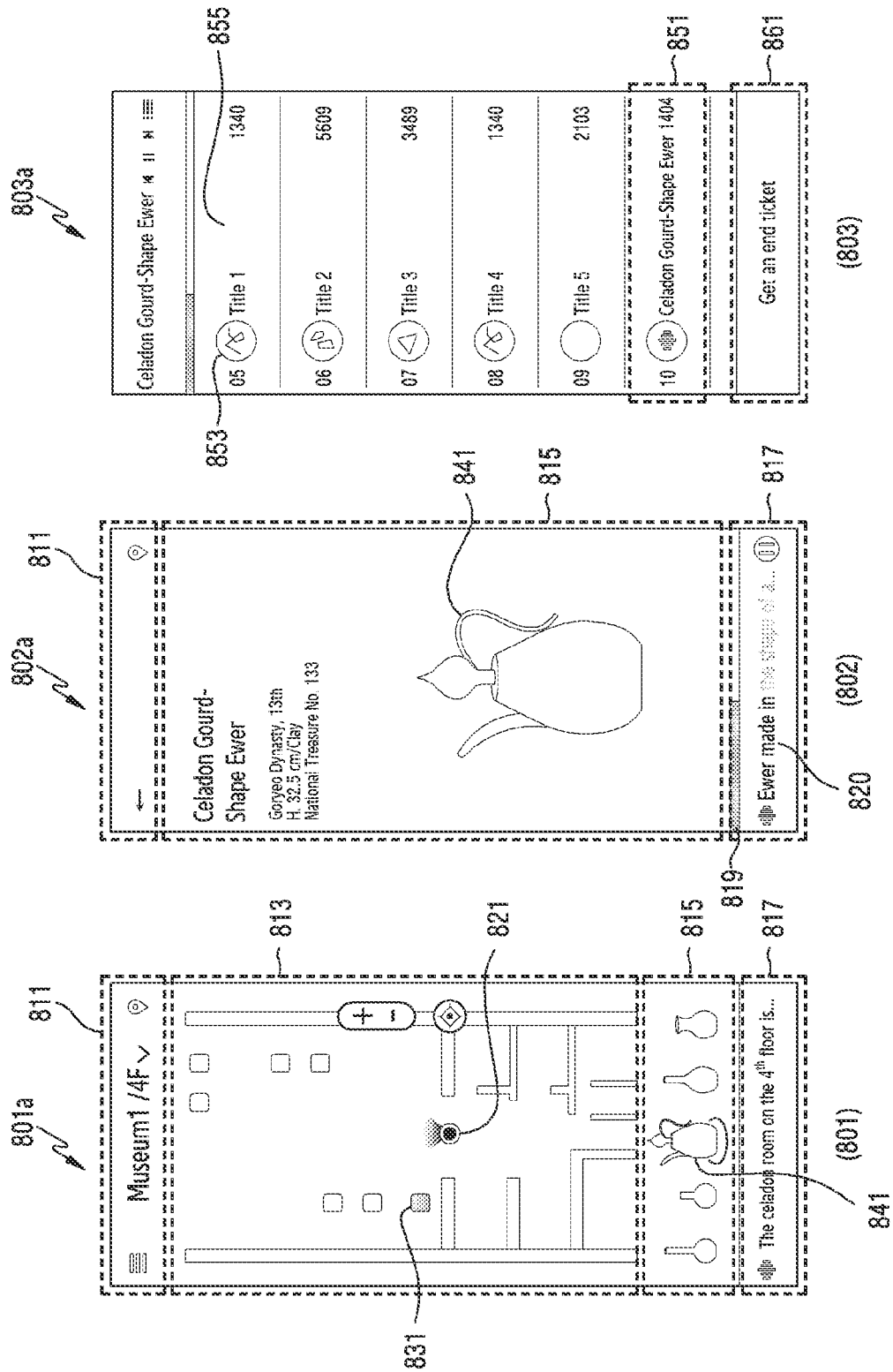
FIG. 8 is a view illustrating user interfaces which display information on played contents according to an embodiment.

FIG. 8 illustrates user interfaces which display information regarding played contents according to an embodiment.

View 801 of FIG. 8 illustrates a fifth user interface 801a corresponding to the third user interface 703a of FIG. 7. When the electronic device 201 is positioned in the third target area 612 of FIG. 6A, the electronic device 201 may display the fifth user interface 801a. The fifth user interface 801a may include a first portion 811 displaying information related to the position of the electronic device 201, a second portion 813 displaying a map displaying a current position 821 of the electronic device 201 and a nearby object 831, a third portion 815 displaying images of objects positioned in the proximity of the electronic device 201 and corresponding to reproducible contents, and a fourth portion 817 displaying a text corresponding to a played voice.

According to an embodiment, the second portion 813 of the fifth user interface 801a may display the map displaying the current position 821 of the electronic device 201 and the object 831 positioned in the proximity of the electronic device 201.

According to an embodiment, the third portion 815 of the fifth user interface 801a may display images corresponding to the objects positioned in the proximity of the electronic device 201, and an image 841 corresponding to an object closest to the electronic device 201 may be displayed to be relatively larger than images corresponding to the objects.

View 802 of FIG. 8 illustrates a sixth user interface 802a corresponding to the fourth user interface 704a of FIG. 7. When the electronic device 201 is positioned in the fourth target area 613 of FIG. 6A, the electronic device 201 may display the sixth user interface 802a. The sixth user interface 802a may include the first portion 811, the third portion 815, and the fourth portion 817. The sixth user interface 802a may include the second portion 813 although this is not illustrated, and an area of the second portion 813 included in the sixth user interface 802a may be smaller than the area of the second portion 813 included in the fifth user interface 801a.

According to an embodiment, the third portion 815 of the sixth user interface 802a may display an image 841 related to the object 831 closest to the electronic device 201.

According to an embodiment, the fourth portion 817 of the sixth user interface 802a may display a text 820 corresponding to a currently played voice, and may display a play bar 819 indicating a current play point of the total play time.

According to an embodiment, the electronic device 201 may display a seventh user interface 803a in response to a user input to identify history information of contents played by the electronic device 201. The seventh user interface 803a may display information regarding the contents played by the electronic device 201. For example, the seventh user interface 803a may display identification images 853 (for example, a work image) corresponding to the played contents, and identifier texts 855 (for example, a work title, an artist name). The seventh user interface 803a may display an identification image and an identification text regarding a currently played content 851.

According to an embodiment, the seventh user interface 803a may display a display 861 for generating a user multimedia content. The electronic device 201 may generate a user multimedia content in response to a user input on the display 861 for generating the user multimedia content.

Figure 9:
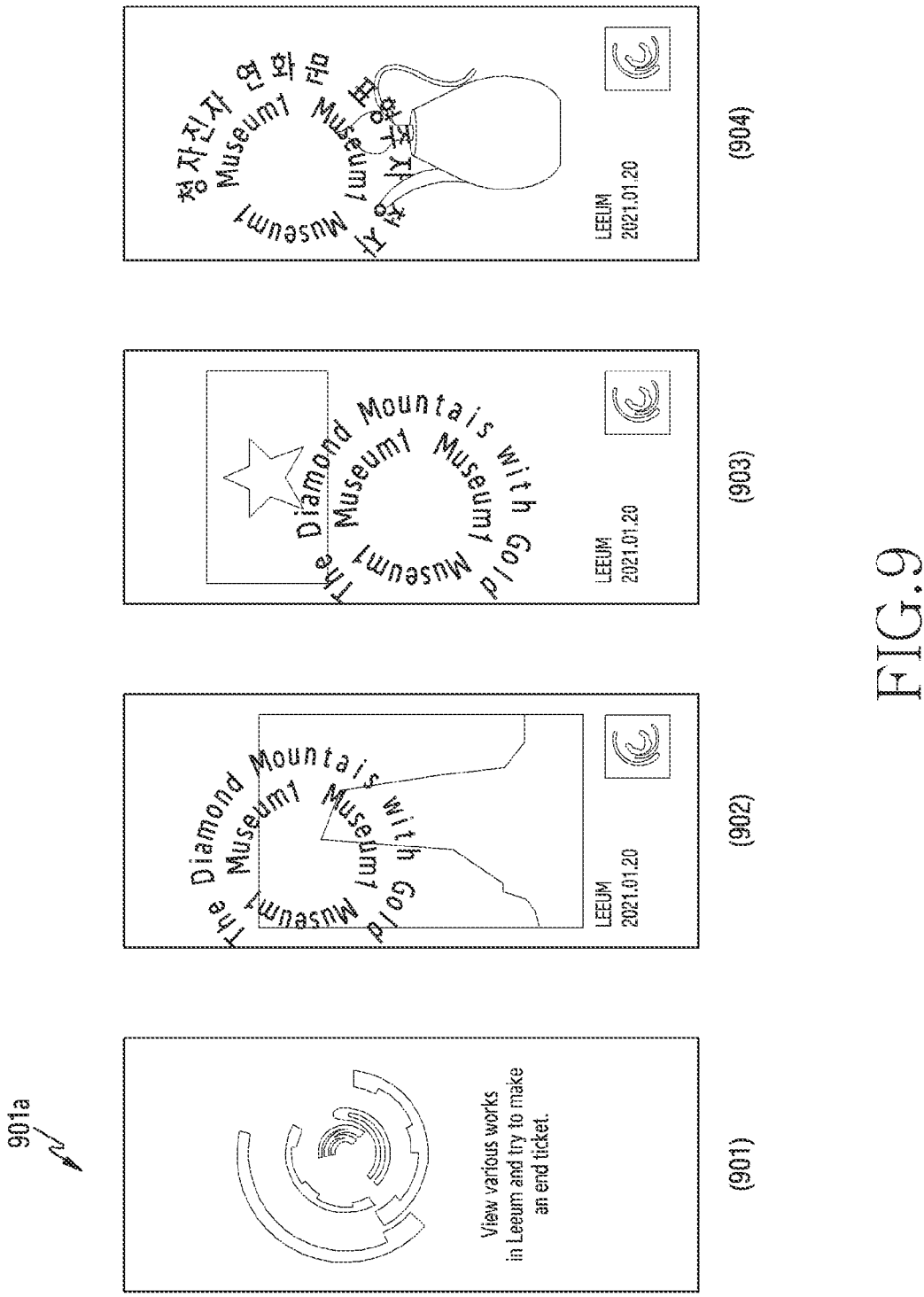
FIG. 9 is a view illustrating user interfaces which are displayed according to acquisition of a user input for generating a user multimedia content according to an embodiment.

FIG. 9 illustrates user interfaces which are displayed according to acquisition of a user input for generating a user multimedia content according to an embodiment.

View 901 of FIG. 9 illustrates a user interface 901a which is displayed by the electronic device 201 when a condition for generating the user multimedia content is not satisfied in response to a user input for generating the user multimedia content being acquired. For example, when the number of contents played by the electronic device 201 is smaller than a set number (for example, 5), the electronic device 201 may determine that the condition for generating the user multimedia content is not satisfied, and may display the user interface 901a.

According to an embodiment, views 902 to 904 of FIG. 9 may show images corresponding to the contents played by the electronic device 201. For example, a first image 902 may correspond to a first content, a second image 903 may correspond to a second content, and a third image 904 may correspond to a third content. The image may include information related to the object corresponding to the played content. For example, the image may include an image of an exhibition work seen by a user, a title, a subtitle related to the exhibition work, a place where the exhibition work is positioned, a date when the user visits the exhibition hall, and a brand logo of a gallery.

According to an embodiment, the user multimedia content may be a multimedia content that is generated by using at least one content selected from the played contents based on interest information. For example, the user multimedia content may be a video content which displays the first image 902, the second image 903, and the third image 904 in sequence and/or continuously.

Figure 10:
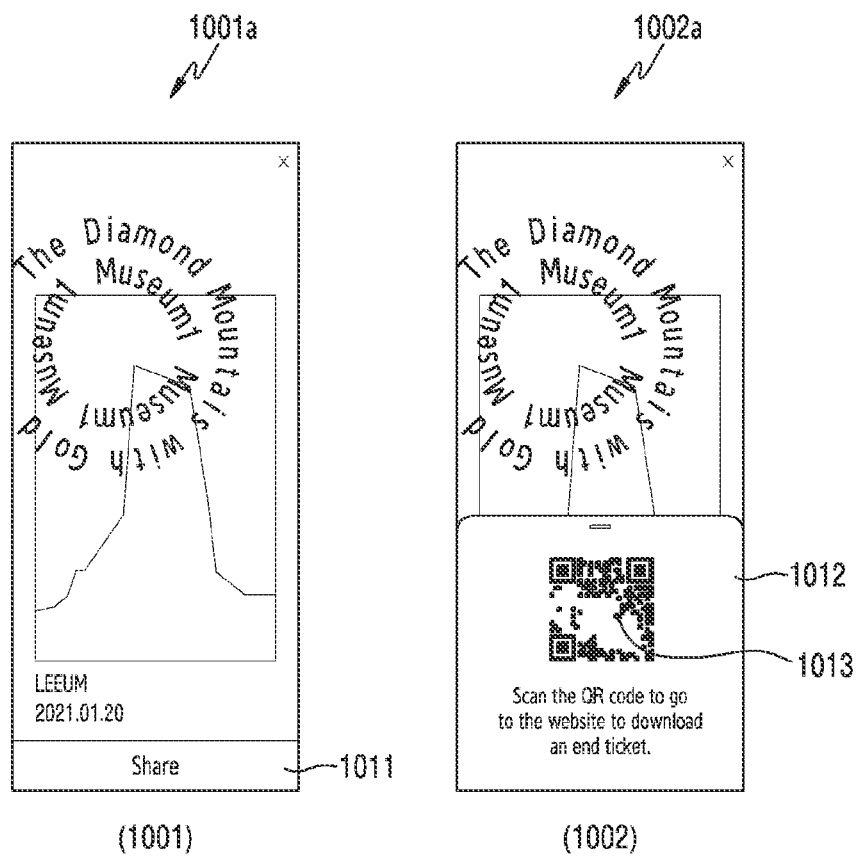
FIG. 10 is a view illustrating user interfaces which provide a function of sharing a user multimedia content according to an embodiment.

FIG. 10 illustrates a user interface which provides a function of sharing a user multimedia content according to an embodiment.

View 1001 of FIG. 10 illustrates a user interface 1001a which is displayed in response to a user multimedia content being generated. The electronic device 201 may generate the user multimedia content in response to a user input for generating the user multimedia content being acquired, and may display the user interface 1001a. The user interface 1001a may include a display 1011 for sharing the user multimedia content. The electronic device 201 may acquire a user input to select the display 1011 for sharing the user multimedia content.

View 1002 of FIG. 10 illustrates a user interface 1002a which is displayed in response to the display 1011 for sharing the user multimedia content being selected. The electronic device 201 may display a user interface 1012 including an image 1013 (for example, a QR code, URL information) corresponding to link information of the generated user multimedia content. In response to the user input to select the display 1011 for sharing the user multimedia content being acquired, the electronic device 201 may display the user interface 1012 while gradually moving the user interface 1012 including the image 1013 (for example, the QR code, the URL information) corresponding to the link information to an upper end from a lower end of the user interface 1002a.

Figure 11:
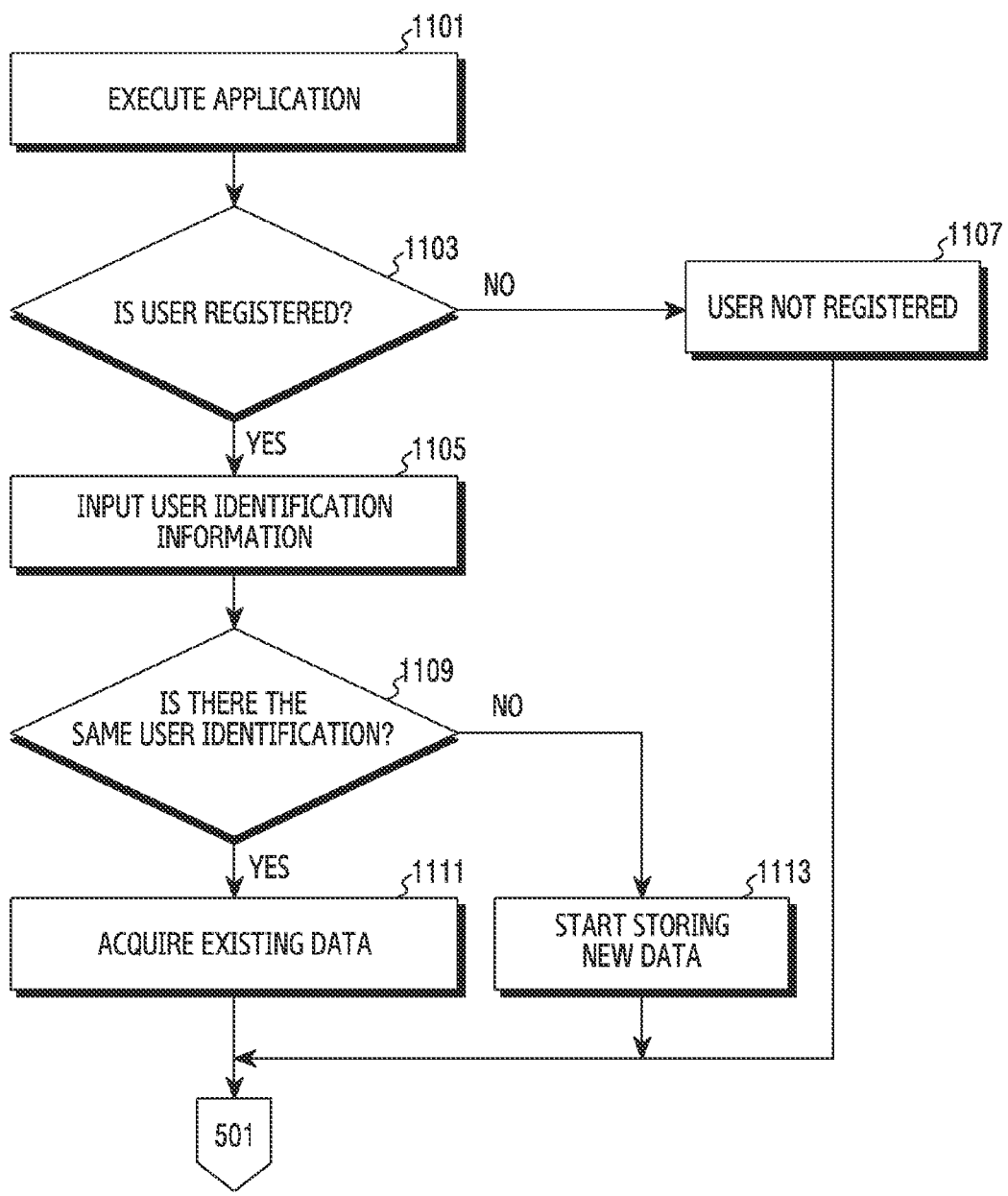
FIG. 11 is a flowchart of operations for determining whether to register a user according to an embodiment.

FIG. 11 illustrates a flowchart of operations for determining whether to register a user according to an embodiment.

A series of operations described below may be performed by the electronic device 201 simultaneously or in a different order, and some operations may be omitted or added.

In operation 1101, the electronic device 201 may acquire a user input to select an application. The electronic device 201 may execute the application in response to the user input being acquired. The application may be understood as an application that displays position information of the electronic device 201, and provides a function of playing a multimedia content corresponding to an object positioned in the proximity of the electronic device 201. For example, the application may display position information of the electronic device 201 which moves in an art museum, and may provide a function of playing a multimedia content corresponding to an exhibition work positioned in the proximity of the electronic device 201.

In operation 1103, the electronic device 201 may determine whether to register the user for the application. The electronic device 201 may display a screen for selecting whether to register the user for the application in response to the application being executed. The electronic device 201 may acquire a user input to perform the user registration. In response to the user input to perform the user registration being acquired, the electronic device 201 may perform user registration for the application. According to an embodiment, when the user registration is performed, the electronic device 201 may perform operation 1105. The electronic device 201 may acquire a user input to refuse to perform the user registration. The electronic device 201 may omit the user registration for the application in response to the user input to refuse to perform the user registration being acquired. According to an embodiment, when the user registration is not performed, the electronic device 201 may perform operation 1107.

When the user registration for the application is performed, the electronic device 201 may acquire user identification information in operation 1105. For example, the electronic device 201 may acquire the user identification information through a user's input. The user identification information may include a user nickname, an email, a phone number, and an SNS address.

In operation 1107, when the user registration for the application is not performed, the electronic device 201 may omit the operation of acquiring the user identification information.

In operation 1109, the electronic device 201 may determine whether there exists the same user identification information as the acquired user identification information in a database of the application. According to an embodiment, when there exists the same user identification information as the acquired user identification information in the database of the application, the electronic device 201 may perform operation 1111. According to an embodiment, when there does not exist the same user identification information as the acquired user identification information, the electronic device 201 may perform operation 1113.

In operation 1111, the electronic device 201 may acquire data corresponding to the user identification information stored in the database from the database of the application. For example, the electronic device 201 may acquire interest information of the user corresponding to the user identification information from the database of the application.

In operation 1113, the electronic device 201 may start storing new data related to the user of the application.

Figure 12:
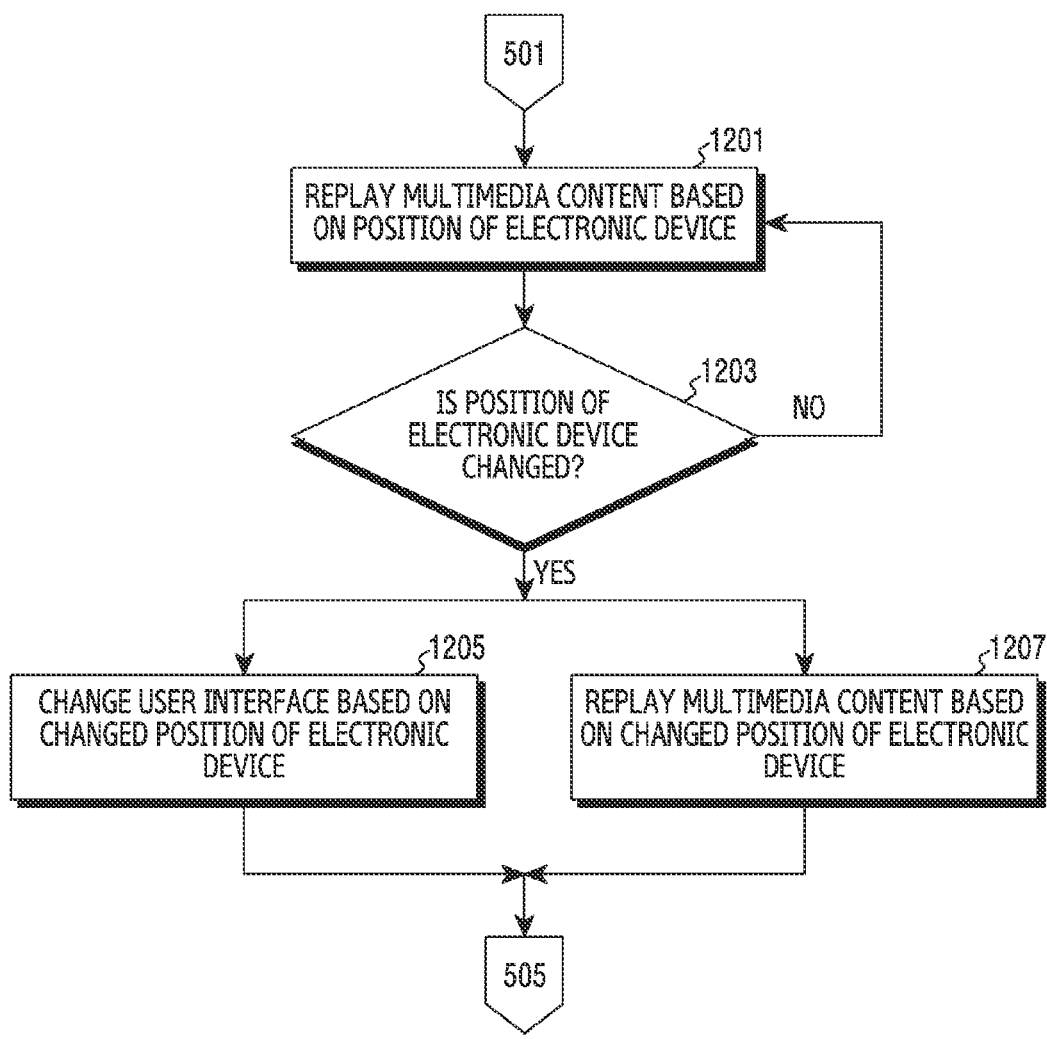
FIG. 12 is a flowchart of operations for changing a displayed user interface and a played multimedia content according to a change in position of an electronic device according to an embodiment.

FIG. 12 illustrates a flowchart of operations of changing a displayed user interface and a played multimedia content according to a change in the position of the electronic device 201 according to an embodiment.

A series of operations explained hereinbelow may be performed by the electronic device 201 simultaneously or in a different order, and some operations may be omitted or added.

In operation 1201, the electronic device 201 may play a multimedia content based on a position of the electronic device 201. Operation 1201 of FIG. 12 may correspond to operation 503 of FIG. 5.

In operation 1203, the electronic device 201 may determine whether an area where the electronic device 201 is positioned is changed. For example, the electronic device 201 may determine whether the area where the electronic device 201 is positioned is changed from a first area (for example, the first area 211 of FIG. 2) to a second area (for example, the second area 212 of FIG. 2). According to an embodiment, when the area where the electronic device 201 is positioned is not changed, the electronic device 201 may perform operation 1201. According to an embodiment, when the area where the electronic device 201 is positioned is changed, the electronic device 201 may perform operations 1205 and 1207.

In operation 1205, in response to the change of the area where the electronic device 201 is positioned, the electronic device 201 may display a user interface corresponding to the changed area. For example, when the area where the electronic device 201 is positioned is changed from the first area (for example, the first area 211 of FIG. 2) to the second area (for example, the second area 212 of FIG. 2), the electronic device 201 may change a user interface displaying information related to a first multimedia content corresponding to the first area to a user interface displaying information related to a second multimedia content corresponding to the second area. Information related to the multimedia content may include, for example, the image 741 and the detailed explanation information 742 which are displayed on the fourth user interface 704*a* of FIG. 7.

In operation 1207, the electronic device 201 may play a multimedia content corresponding to the changed area in response to the change of the area where the electronic device 201 is positioned. For example, when the area where the electronic device 201 is positioned is changed from the first area (for example, the first area 211 of FIG. 2) to the second area (for example, the second area 212 of FIG. 2), the electronic device 201 may change the first multimedia content corresponding to the first area to the second multimedia content corresponding to the second area, and may play the second multimedia content.

According to an embodiment, when the area where the electronic device 201 is positioned is changed from the first area 211 to the second area 212 while the electronic device 201 is playing the first multimedia content, the electronic device 201 may complete playing of the first multimedia content, and may play the second multimedia content.

According to an embodiment, when the area where the electronic device 201 is positioned is changed from the first area 211 to the second area 212 while the electronic device 201 is playing the first multimedia content, the electronic device 201 may display a notification displaying that the second multimedia content is reproducible on a certain area of the displayed user interface.

According to an embodiment, when the area where the electronic device 201 is positioned is changed from the first area 211 to the second area 212 while the electronic device 201 is playing the first multimedia content, the electronic device 201 may change the first multimedia content to the second multimedia content at the time when the area is changed, and may play the second multimedia content.

Figure 13:
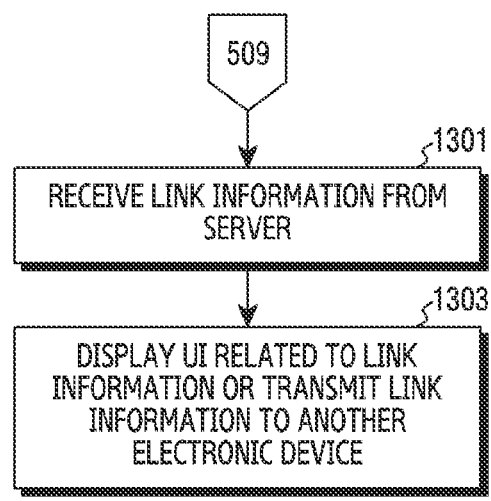
FIG. 13 is a flowchart of operations for sharing a user multimedia content according to an embodiment.

FIG. 13 illustrates a flowchart of operations of sharing a user multimedia content according to an embodiment.

A series of operations explained hereinbelow may be performed by the electronic device 201 simultaneously or in a different order, and some operations may be omitted or added.

In operation 1301, the electronic device 201 may receive link information regarding the user multimedia content from the server 401 through the communication module 330. The link information may include URL information or QR code information.

In operation 1303, the electronic device 201 may display an image related to the received link information or may transmit the link information to another electronic device (for example, a smartphone). For example, when user registration for the application is performed, the electronic device 201 may transmit the link information to another electronic device corresponding to the user identification information. In another example, when the user registration for the application is not performed, the electronic device 201 may display the image (for example, a QR code) related to the link information received from the server 401.

Figure 14:
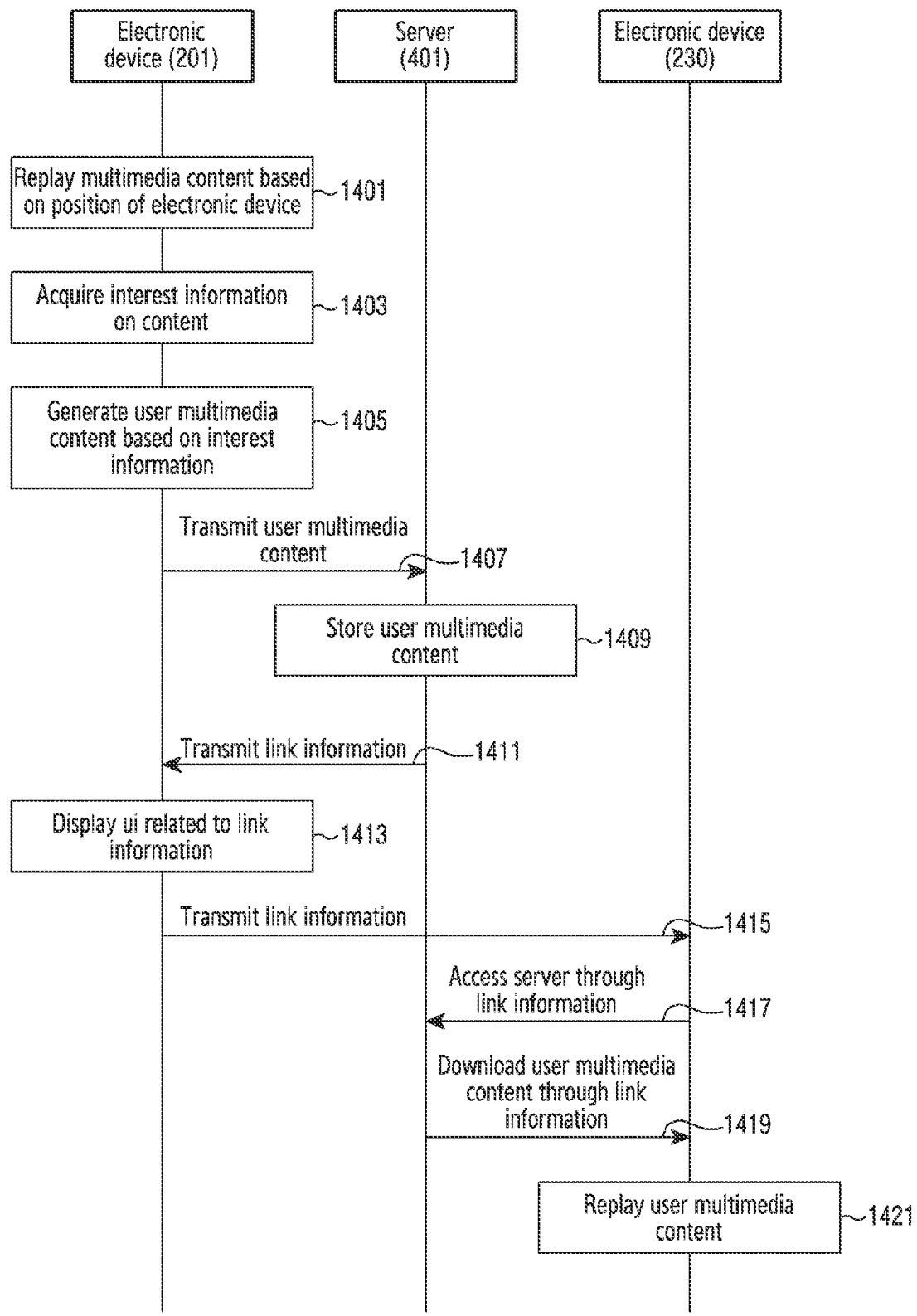
FIG. 14 is a flowchart of operations for sharing a user multimedia content according to an embodiment.

FIG. 14 illustrates a flowchart of operations of sharing a user multimedia content according to an embodiment.

In operation 1401, the electronic device 201 may play (which may include playing for a first time or an additional time subsequent to the first time) a multimedia content based on a position of the electronic device 201. The electronic device 201 may play a multimedia content corresponding to an area where the electronic device 201 is positioned. Operation 1401 of FIG. 14 may correspond to operation 503 of FIG. 5.

In operation 1403, the electronic device 201 may acquire interest information regarding a content including the played multimedia content. The electronic device 201 may determine a degree of interest in the content based on the interest information. Operation 1403 of FIG. 14 may correspond to operation 505 of FIG. 5.

In operation 1405, the electronic device 201 may generate a user multimedia content based on the interest information. The electronic device 201 may generate the user multimedia content, based on the interest information, in response to a user input on a display (for example, the display 861 of FIG. 8) for generating the user multimedia content being acquired. The electronic device 201 may generate a data file by performing multimedia capturing or recording with respect to the generated content. Operation 1405 of FIG. 14 may correspond to operation 507 of FIG. 5.

In operation 1407, the electronic device 201 may transmit the user multimedia content or the data file to the server 401 through the communication module 330. Operation 1407 of FIG. 14 may correspond to operation 509 of FIG. 5. According to an embodiment, the operation of the electronic device 201 transmitting the user multimedia content or the data file to the server 401 through the communication module 330 may be performed while operation 1415 is performed.

In operation 1409, the server 401 may receive the user multimedia content or the generated data file from the electronic device 201. The server 401 may store the user multimedia content or the generated data file during a designated period (for example, N days). When a period during which the user multimedia content or the data file is stored exceeds the designated period, the server 401 may delete the user multimedia content or the generated data.

In operation 1411, the server 401 may transmit link information corresponding to the user multimedia content or the data file to the electronic device 201. The link information may include URL information or QR code information.

In operation 1413, the electronic device 201 may receive the link information from the server 401 through the communication module 330. The electronic device 201 may display an image (for example, a QR code) related to the link information. For example, when the user registration for the application is not performed, the electronic device 201 may display an image related to the link information.

In operation 1415, the electronic device 201 may transmit the link information to another electronic device 230 through the communication module 330. For example, when the user registration for the application is not performed, another electronic device 230 may acquire the link information by scanning the image related to the link information displayed by the electronic device 201 with a camera of another electronic device 230. In another example, when the user registration for the application is performed, the electronic device 201 may transmit the link information to another electronic device 230 corresponding to user identification information.

According to an embodiment, the electronic device 201 may transmit the user multimedia content or the data file to another electronic device 230 through the communication module 330.

In operation 1417, another electronic device 230 may access the server 401 based on the link information.

According to an embodiment, during the period in which the server 401 stores the user multimedia content, another electronic device 230 may access the server 401 based on the link information. When another electronic device 230 accesses the server 401 based on the link information while the server 401 is storing the user multimedia content, another electronic device 230 may play (which may include playing for a first time or an additional time subsequent to the first time) the user multimedia content.

According to an embodiment, after the period in which the server 401 stores the user multimedia content, another electronic device 230 may access the server 401 based on the link information. When another electronic device 230 accesses the server 401 after the period in which the server 401 stores the user multimedia content, another electronic device 230 may receive a server multimedia content from the server 401. The server multimedia content may be a multimedia content that includes information provided by the server 401. For example, the server multimedia content may include an advertisement related to the multimedia content or information (for example, next exhibition planning information) regarding the space 210 where the object corresponding to the multimedia content is positioned.

In operation 1419, when another electronic device 230 accesses the server 401 during the period in which the server 401 stores the user multimedia content, another electronic device 230 may download the user multimedia content stored in the server 410 from the server 401, based on the received link information.

In operation 1421, another electronic device 230 may play (which may include playing for a first time or an additional time subsequent to the first time) the user multimedia content. Another electronic device 230 may play (which may include playing for a first time or an additional time subsequent to the first time) the downloaded user multimedia content.

According to an embodiment, when another electronic device 230 accesses the server 401 based on the link information during the period in which the server 401 stores the user multimedia content, another electronic device 230 may play streams of the user multimedia content.

According to an embodiment, when another electronic device 230 accesses the server 401 based on the link information after the period in which the server 401 stores the user multimedia content, another electronic device 230 may play the server multimedia content provided from the server 401.

Figure 15:
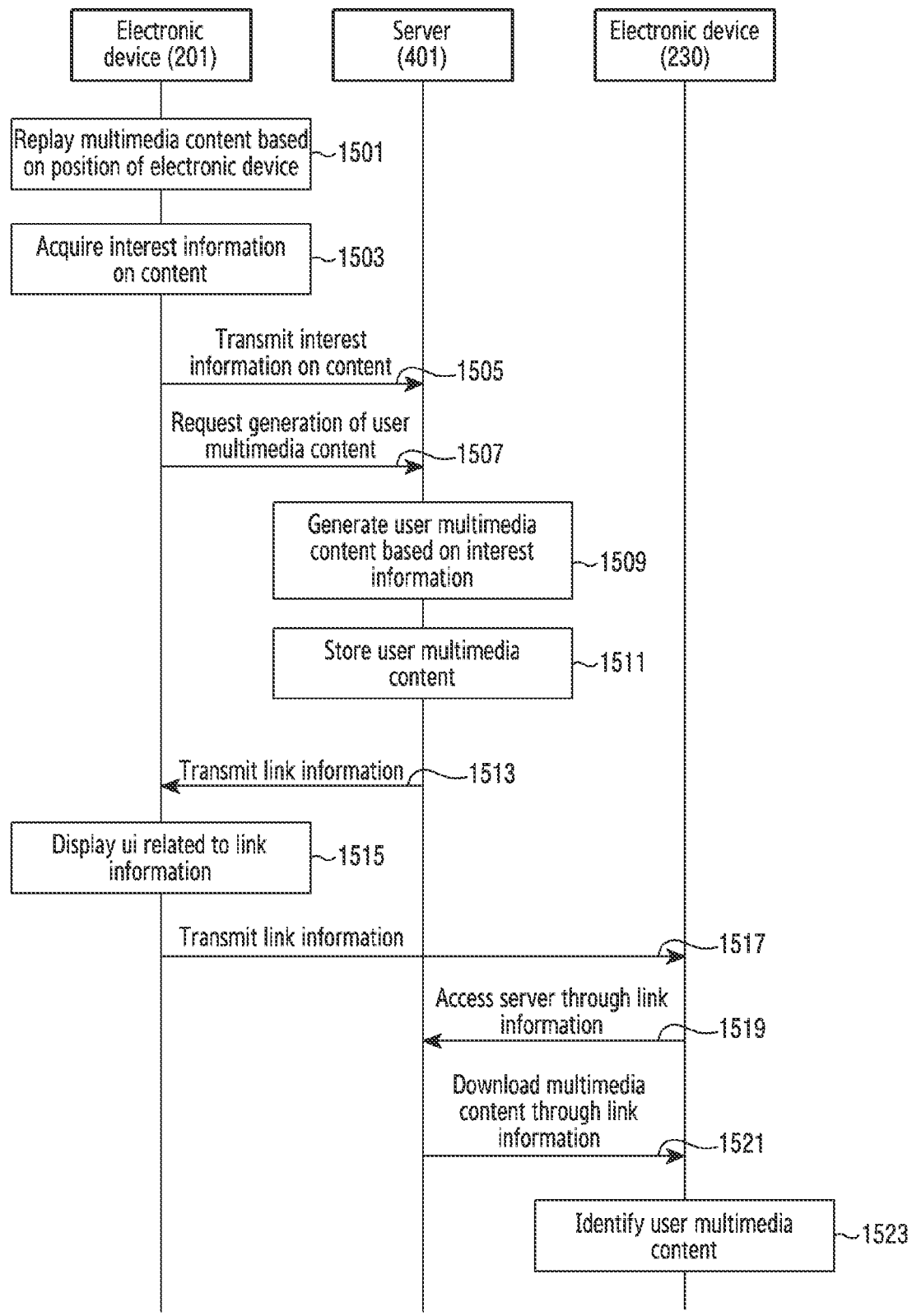
FIG. 15 is a flowchart of operations for sharing a user multimedia content according to an embodiment.

FIG. 15 illustrates a flowchart of operations of sharing a user multimedia content according to an embodiment.

In operation 1501, the electronic device 201 may play (which may include playing for a first time or an additional time subsequent to the first time) a multimedia content based on a position of the electronic device 201. The electronic device 201 may play a multimedia content corresponding to an area where the electronic device 201 is positioned. For example, where the electronic device 201 is positioned in a certain area (for example, the first area 211 of FIG. 2) among the plurality of areas included in the space 210, the electronic device 201 may play a multimedia content corresponding to the certain area. Operation 1501 of FIG. 15 may correspond to operation 1401 of FIG. 14 and operation 503 of FIG. 5.

In operation 1503, the electronic device 201 may acquire interest information regarding the played multimedia content. The electronic device 201 may acquire interest information regarding each of the plurality of played multimedia contents. For example, when the electronic device 201 plays a first multimedia content, the electronic device 201 may acquire first interest information regarding the first multimedia content. In another example, when the electronic device 201 plays (which may include playing for a first time or an additional time subsequent to the first time) a second multimedia content, the electronic device 201 may acquire second interest information regarding the second multimedia content. The electronic device 201 may determine a degree of user's interest in each of the played multimedia contents, based on the acquired interest information (for example, the first interest information or the second interest information). Operation 1503 of FIG. 15 may correspond to operation 1403 of FIG. 14 and operation 505 of FIG. 5.

In operation 1505, the electronic device 201 may transmit the acquired interest information to the server 401. For example, the electronic device 201 may transmit the first interest information regarding the first multimedia content and/or the second interest information regarding the second multimedia content to the server 401.

According to an embodiment, when the electronic device 201 acquires a plurality of pieces of interest information, the electronic device 201 may transmit all or some of the plurality of pieces of interest information to the server 401. For example, when the electronic device 201 acquires 10 pieces of interest information, the electronic device 201 may transmit the 10 pieces of interest information to the server 401. In another example, when the electronic device 201 acquires the 10 pieces of interest information, the electronic device 201 may transmit, to the server 401, top 5 pieces of interest information which are determined to have a high degree of interest in the played multimedia contents from among the 10 pieces of interest information.

According to an embodiment, when the electronic device 201 acquires the plurality of pieces of interest information, the electronic device 201 may transmit all or some of the plurality of pieces of interest information to the server 401 based on a user's input. When the electronic device 201 acquires the plurality of pieces of interest information, the electronic device 201 may acquire a user input to designate the number of pieces of interest information to transmit to the server 401. The electronic device 201 may transmit, to the server 401, the designated number of pieces of interest information among the plurality of pieces of interest information, based on the acquired user input. For example, when the electronic device 201 acquires 10 pieces of interest information, the electronic device 201 may acquire a user input to designate the number (for example, 5) of pieces of interest information to transmit to the server 401. The electronic device 201 may transmit the designated number of pieces of interest information (for example, 5) among the plurality of pieces of interest information to the server 401.

In operation 1507, the electronic device 201 may transmit a request for generating a user multimedia content to the server 401. The electronic device 201 may acquire a user input to transmit the request for generating the user multimedia content. In response to the user input being acquired, the electronic device 201 may transmit the request for generating the user multimedia content to the server 401. Operation 1505 of FIG. 15 and operation 1507 of FIG. 15 may be changed in order, or may be performed substantially at the same time. For example, in response to the electronic device 201 transmitting the request for generating the user multimedia content to the server 401, the electronic device 201 may transmit the interest information to the server 401. In another example, in response to the electronic device 201 acquiring a user input for generating the user multimedia content, the electronic device 201 may transmit the request for generating the user multimedia content and the interest information to the server 401 substantially at the same time.

According to an embodiment, the electronic device 201 may automatically or manually transmit, to the server 401, the request for generating the user multimedia content and multimedia contents used for generating the user multimedia content and/or contents (for example, a photog content, a video content, or an AR content) related to the multimedia contents. For example, the electronic device 201 may automatically or manually transmit the multimedia contents played by the electronic device 201 and contents generated by interactions related to the played multimedia contents to the server 401, while transmitting the request for generating the user multimedia content to the server 401. The contents generated by the interactions may include a photo, a video which are created by photographing an object corresponding to the multimedia content, or an AR content related to the object.

In operation 1509, the server 401 may generate the user multimedia content based on the interest information received from the electronic device 201. The server 401 may generate the user multimedia content, based on the plurality of pieces of interest information (for example, the first interest information, the second interest information) received from the electronic device 201. Operation 1509 of FIG. 15 may be different from operation 1405 of FIG. 14 and operation 507 of FIG. 5 only in the operating entity, and may substantially correspond thereto.

In operation 1511, the server 401 may store the generated user multimedia content. The server 401 may store the generated user multimedia content during a designated period (for example, N days). When a period in which the user multimedia content is stored exceeds the designated period, the server 401 may delete the user multimedia content. In operation 1513, the server 401 may transmit link information corresponding to the user multimedia content to the electronic device 201. The link information may include URL information or QR code information.

In operation 1515, the electronic device 201 may receive the link information from the server 401 through the communication module 330. A UI (for example, a QR code) related to the link information received from the server 401 may be displayed. For example, when user registration for the application is not performed, the electronic device 201 may display a UI related to the link information through the display 340.

In operation 1517, the electronic device 201 may transmit the link information to another electronic device 230 through the communication module 330. For example, when the electronic device 201 does not perform the user registration for the application, another electronic device may acquire the link information by scanning the UI (for example, the QR code) related to the link information displayed by the electronic device 201 through a camera of another electronic device 230. In another example, when the electronic device 201 performs the user registration for the application, the electronic device 201 may transmit the link information to another electronic device 230 corresponding to user identification information which is used for the user registration for the application.

In operation 1519, another electronic device 230 may access the server 410 based on the link information received from the electronic device 201. In another example, another electronic device 230 may receive a user input to select the received link information. In response to the user input to select the received link information being acquired, another electronic device 230 may access the server 401.

According to an embodiment, when another electronic device 230 accesses the server 401 during the period in which the server 401 stores the user multimedia content, another electronic device 230 may play the user multimedia content. For example, when another electronic device 230 accesses the server 401 while the server 401 is storing the user multimedia content, another electronic device 230 may play streams of the user multimedia content or may download the user multimedia content from the server 401 and may play the user multimedia content.

According to an embodiment, when another electronic device 230 accesses the server 401 after the period in which the server 401 stores the user multimedia content, another electronic device 230 may receive a server multimedia content from the server 401. The server multimedia content may be a multimedia content that is separately provided by the server 401. For example, the server multimedia content may include an advertisement related to the multimedia content or information (for example, next exhibition planning information) regarding the space 210 where an object corresponding to the multimedia content is positioned.

In operation 1521, another electronic device 230 may download the user multimedia content corresponding to the link information from the server 401 that another electronic device 230 accesses to based on the link information. For example, when another electronic device 230 accesses the server 401 during the period in which the server 401 stores the user multimedia content, another electronic device 230 may download the user multimedia content corresponding to the link information from the server 401.

In operation 1523, another electronic device 230 may play the user multimedia content. According to an embodiment, another electronic device 230 may play streams of the user multimedia content. For example, when another electronic device 230 accesses the server 401 based on the link information during the period in which the server 401 stores the user multimedia content, another electronic device 230 may play streams of the user multimedia content corresponding to the link information.

According to an embodiment, another electronic device 230 may play the user multimedia content downloaded form the server 401. For example, when another electronic device 230 accesses the server 401 based on the link information after the period in which the server 401 stores the user multimedia content, another electronic device 230 may download the user multimedia content from the server 401. Another electronic device 230 may play the downloaded user multimedia content.

According to an embodiment, an electronic device 201 may include a UWB communication module 320, a communication module 330; and a processor 310 operatively connected with the UWB communication module 320 and the communication module 330. The processor 310 may determine a position of the electronic device 201 based on a UWB signal received through the UWB communication module 320. The processor 310 may determine an area where the electronic device 201 is positioned among the plurality of areas, based on a result of comparing the position and map information defining a plurality of areas included in a space where an external device transmitting the UWB signal is installed. The processor 310 may play (which may include playing for a first time or an additional time subsequent to the first time) a multimedia content corresponding to the area. The processor 310 may acquire interest information regarding a plurality of multimedia contents including the multimedia content played by the electronic device 201. The processor 310 may select at least one multimedia content from the plurality of multimedia contents based on the interest information. The processor 310 may generate a user multimedia content by using the at least one selected multimedia content. The processor 310 may transmit the user multimedia content to a server 401 through the communication module 330.

According to an embodiment, the interest information may include first information regarding a time during which the electronic device 201 stays in the area where the electronic device is positioned, second information regarding playing of the plurality of multimedia contents, and/or third information related to interactions of a user.

According to an embodiment, responsive to a number of multimedia contents played by the electronic device 201 satisfying a designated number, the processor 310 may determine a value by dividing a play time of the played multimedia content by a total play time. The processor 310 may select at least one multimedia content from the played plurality of multimedia contents, based on a size of the value. The processor 310 may generate the user multimedia content by using the at least one selected multimedia content.

According to an embodiment, while the electronic device 201 is positioned in a first space, the processor 310 may acquire the interest information on a plurality of first multimedia contents played by the electronic device. The processor 310 may select a third multimedia content from the plurality of first multimedia contents, based on the interest information. While the electronic device 201 is positioned in a second space, the processor 310 may acquire the interest information on a plurality of second multimedia contents played by the electronic device 201. The processor 310 may select a fourth multimedia content from the plurality of second multimedia contents, based on the interest information. The processor 310 may generate the user multimedia content by using the third multimedia content and the fourth multimedia content which are selected.

According to an embodiment, the electronic device 201 may include a display 340 and a speaker 350. The processor 310 may display visual information corresponding to the multimedia content through the display 340. The processor 310 may output audio data corresponding to the multimedia content through the speaker 350.

According to an embodiment, the processor 310 may determine whether the area where the electronic device is positioned is changed, based on the UWB signal, while playing the multimedia content. In response to it being determined that the area where the electronic device 201 is positioned is changed, display a notification indicating that the played multimedia content is changed to a multimedia content corresponding to the changed area, through the display 340.

According to an embodiment, the processor 310 may determine whether the area where the electronic device 201 is positioned is changed, based on the UWB signal, while playing the multimedia content. In response to it being determined that the area where the electronic device 201 is positioned is changed, the processor 310 may change the played multimedia content to a multimedia content corresponding to the changed area and may play the multimedia content.

According to an embodiment, the processor 310 may receive link information corresponding to the user multimedia content from the server 401. The link information may include at least one of URL information or QR code information.

According to an embodiment, the processor 310 may transmit link information corresponding to the user multimedia content, received from the server 401 through the communication module 330, to another electronic device 230.

According to an embodiment, the processor 310 may display a user interface corresponding to the area through the display 340.

According to an embodiment, in response to determining that the area where the electronic device 201 is positioned is a first area, the processor 310 may display a first user interface 701*a* corresponding to the first area through the display 340. In response to determining that the area where the electronic device 201 is positioned is a second area, the processor 310 may display a second user interface 702*a* corresponding to the second area through the display 340.

According to an embodiment, the user interface may include a first portion to display information related to the position of the electronic device 201, a second portion to display images of objects positioned in the proximity of the electronic device, and a third portion to display a text corresponding to a played voice.

According to an embodiment, the processor 310 may determine whether the position of the electronic device is changed, based on the UWB signal. In response to it being determined that the position of the electronic device 201 is changed, the processor 310 may change sizes of the first portion and the second portion.

According to an embodiment, when the electronic device 201 is positioned at longer than a designated distance from an object positioned in the proximity of the electronic device 201, the processor 310 may display a third user interface including the second portion having a first size and the third portion having a second size.

According to an embodiment, when the electronic device 201 is positioned within the designated distance from the object positioned in the proximity of the electronic device 201, the processor 310 may display a fourth user interface including the second portion having a third size smaller than the first size, and the third portion having a fourth size larger than the second size.

According to an embodiment, the processor 310 may determine whether the position of the electronic device 201 is within a designated distance from an object positioned in the proximity of the electronic device 201, based on the UWB signal. When the position of the electronic device 201 is within the designated distance, the processor 310 may display a notification indicating that the multimedia content corresponding to the object is played.

According to an embodiment, an operating method of an electronic device 201 may include: determining a position of the electronic device 201 based on a UWB signal received through a UWB communication module 320 of the electronic device 201; based on a result of comparing the determined position and map information defining a plurality of areas included in a space where an external device transmitting the UWB signal is installed, determining an area where the electronic device is positioned among the plurality of areas; playing a multimedia content corresponding to the area; acquiring interest information regarding a plurality of multimedia contents including the multimedia content played by the electronic device 201; selecting at least one multimedia content from the plurality of multimedia contents based on the interest information; generating a user multimedia content by using the at least one selected multimedia content; and transmitting the user multimedia content to a server 401 through a communication module 330 of the electronic device 201.

According to an embodiment, the operating method of the electronic device 201 may include determining whether the area where the electronic device 201 is positioned is changed, based on the UWB signal, while playing the multimedia content; and, in response to it being determined that the area where the electronic device 201 is positioned is changed, changing the played multimedia content to a multimedia content corresponding to the changed area and playing the multimedia content.

According to an embodiment, the operating method of the electronic device 201 may include: in response to determining that the area where the electronic device 201 is positioned is a first area, displaying a first user interface corresponding to the first area through a display 340; and, in response to determining that the area where the electronic device 201 is positioned is a second area, displaying a second user interface corresponding to the second area through the display 340.

According to an embodiment, a positioning system 400 may include an electronic device 201, a server 410, and an external device (for example, the UWB anchor 403 of FIG. 4). The electronic device 201 may determine a position of the electronic device 201 based on a UWB signal received through a UWB communication module 320 included in the electronic device 20; based on a result of comparing the position and map information defining a plurality of areas included in a space where an external device transmitting the UWB signal is installed, may determine an area where the electronic device is positioned among the plurality of areas, may play a multimedia content corresponding to the area, may acquire interest information regarding a plurality of multimedia contents including the multimedia content played by the electronic device 201, may select at least one multimedia content from the plurality of multimedia contents based on the interest information, may generate a user multimedia content by using the at least one selected multimedia content, and may transmit the generated user multimedia content to the server 401 through a communication module 330. The server 401 may store the user multimedia content received from the electronic device 201, may transmit link information of the user multimedia content to the electronic device 201, and may transmit the link information received from the server 401 to another electronic device 230, and another electronic device 230 may download, from the server 401, the user multimedia content corresponding to the link information received from the electronic device 201.

The effect achieved by the disclosure is not limited to those mentioned above, and other effects that are not mentioned above may be clearly understood to those skilled in the art based on the description provided below.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed explanations of the disclosure, various changes in form and details may be made therein without departing from the scope of the disclosure. Therefore, the scope of the disclosure is defined not by the embodiments described above but by the appended claims and equivalents to the claims.

The invention claimed is:

1. An electronic device comprising:
an ultra-wideband (UWB) communication module;
a communication module; and
a processor,
memory storing instructions that, when executed by the processor, cause the electronic device to:
determine a position of the electronic device based on a UWB signal received through the UWB communication module;
based on a result of comparing the position and map information defining a plurality of areas included in a space where an external device transmitting the UWB signal is installed, determine an area where the electronic device is positioned among the plurality of areas;
play a multimedia content corresponding to the area;
acquire interest information regarding a plurality of multimedia contents comprising the multimedia content played by the electronic device;
select at least one multimedia content from the plurality of multimedia contents based on the interest information;
generate a user multimedia content by using the at least one selected multimedia content, wherein the user multimedia content is generated based at least in part on a number of multimedia contents played by the electronic device and a number of spaces; and
transmit the user multimedia content to a server through the communication module.

2. The electronic device of claim 1, wherein the interest information comprises first information regarding a time during which the electronic device stays in the area where the electronic device is positioned, second information regarding playing of the plurality of multimedia contents, and third information related to interactions of a user.

3. The electronic device of claim 1, wherein the instructions, when executed by the processor, cause the electronic device to:
responsive to the number of multimedia contents played by the electronic device satisfying a designated number, determine a value by dividing a play time of the multimedia content by a total play time;
based on a size of the value, select at least one multimedia content from the plurality of multimedia contents; and
generate the user multimedia content by using the at least one selected multimedia content.

4. The electronic device of claim 1, wherein the instructions, when executed by the processor, cause the electronic device to:
while the electronic device is positioned in a first space, acquire the interest information on a plurality of first multimedia contents played by the electronic device;
based on the interest information, select a third multimedia content from the plurality of first multimedia contents;
while the electronic device is positioned in a second space, acquire the interest information on a plurality of second multimedia contents played by the electronic device;
based on the interest information, select a fourth multimedia content from the plurality of second multimedia contents; and
generate the user multimedia content by using the third multimedia content and the fourth multimedia content which are selected.

5. The electronic device of claim 1, comprising a display and a speaker,
wherein the instructions, when executed by the processor, cause the electronic device to:
display visual information corresponding to the multimedia content through the display; and
output audio data corresponding to the multimedia content through the speaker.

6. The electronic device of claim 1, wherein the instructions, when executed by the processor, cause the electronic device to:
determine whether the area where the electronic device is positioned is changed, based on the UWB signal, while playing the multimedia content; and
in response to it being determined that the area where the electronic device is positioned is changed, display a notification indicating that the replayed multimedia content is changed to a multimedia content corresponding to the changed area, through the display.

7. The electronic device of claim 1, wherein the instructions, when executed by the processor, cause the electronic device to:
determine whether the area where the electronic device is positioned is changed, based on the UWB signal, while playing the multimedia content; and
in response to it being determined that the area where the electronic device is positioned is changed, change the multimedia content to a multimedia content corresponding to the changed area and play the multimedia content.

8. The electronic device of claim 1, wherein the instructions, when executed by the processor, cause the electronic device to receive link information corresponding to the user multimedia content from the server, and
wherein the link information comprises at least one of URL information or QR code information.

9. The electronic device of claim 1, wherein the instructions, when executed by the processor, cause the electronic device to transmit link information corresponding to the user multimedia content, received from the server through the communication module, to another electronic device.

10. The electronic device of claim 1, wherein the instructions, when executed by the processor, cause the electronic device to display a user interface corresponding to the area through a display.

11. The electronic device of claim 1, wherein the instructions, when executed by the processor, cause the electronic device to:
in response to determining that the area where the electronic device is positioned is a first area, display a first user interface corresponding to the first area through a display; and
in response to determining that the area where the electronic device is positioned is a second area, display a second user interface corresponding to the second area through the display.

12. The electronic device of claim 10, wherein the user interface comprises a first portion to display information related to the position of the electronic device, a second portion to display images of objects positioned in the proximity of the electronic device, and a third portion to display a text corresponding to a played voice.

13. The electronic device of claim 12, wherein the instructions, when executed by the processor, cause the electronic device to:
determine whether the position of the electronic device is changed, based on the UWB signal; and
in response to it being determined that the position of the electronic device is changed, change sizes of the first portion and the second portion.

14. The electronic device of claim 12, wherein the instructions, when executed by the processor, cause the electronic device to, when the electronic device is positioned at longer than a designated distance from an object positioned in the proximity of the electronic device, display a third user interface comprising the second portion having a first size and the third portion having a second size.

15. The electronic device of claim 14, wherein the instructions, when executed by the processor, cause the electronic device to, when the electronic device is positioned within the designated distance from the object positioned in the proximity of the electronic device, display a fourth user interface comprising the second portion having a third size smaller than the first size, and the third portion having a fourth size larger than the second size.

16. The electronic device of claim 1, wherein the instructions, when executed by the processor, cause the electronic device to:
determine whether the position of the electronic device is within a designated distance from an object positioned in the proximity of the electronic device, based on the UWB signal; and when the position of the electronic device is within the designated distance, display a notification indicating that the multimedia content corresponding to the object is played.

17. An operating method of an electronic device, the method comprising:
determining a position of the electronic device based on an ultra-wideband (UWB) signal received through a UWB communication module of the electronic device;
based on a result of comparing the position and map information defining a plurality of areas included in a space where an external device transmitting the UWB signal is installed, determining an area where the electronic device is positioned among the plurality of areas;
playing a multimedia content corresponding to the area;
acquiring interest information regarding a plurality of multimedia contents comprising the multimedia content played by the electronic device;
selecting at least one multimedia content from the plurality of multimedia contents based on the interest information;
generating a user multimedia content by using the at least one selected multimedia content, wherein the user multimedia content is generated based at least in part on a number of multimedia contents played by the electronic device and a number of spaces; and
transmitting the user multimedia content to a server through a communication module of the electronic device.

18. The method of claim 17, comprising:
determining whether the area where the electronic device is positioned is changed, based on the UWB signal, while playing the multimedia content; and
in response to it being determined that the area where the electronic device is positioned is changed, changing the played multimedia content to a multimedia content corresponding to the changed area and playing the multimedia content.

19. The method of claim 17, comprising:
in response to determining that the area where the electronic device is positioned is a first area, displaying a first user interface corresponding to the first area through a display; and
in response to determining that the area where the electronic device is positioned is a second area, displaying a second user interface corresponding to the second area through the display.

20. A system, comprising:
an electronic device configured to:
determine a position of the electronic device based on an ultra-wideband (UWB) signal received through a UWB communication module included in the electronic device;
based on a result of comparing the position and map information defining a plurality of areas included in a space where an external device transmitting the UWB signal is installed, determine an area where the electronic device is positioned among the plurality of areas;
play a multimedia content corresponding to the area;
acquire interest information regarding a plurality of multimedia contents comprising the multimedia content played by the electronic device;
select at least one multimedia content from the plurality of multimedia contents based on the interest information;
generate a user multimedia content by using the at least one selected multimedia content, wherein the user multimedia content is generated based at least in part on a number of multimedia contents played by the electronic device and a number of spaces; and transmit the user multimedia content to a server through a communication module; and the server configured to:

store the user multimedia content received from the electronic device; and transmit link information of the user multimedia content to the electronic device, wherein the electronic device to transmit the link information received from the server to another electronic device, and wherein the another electronic device to download, from the server, the user multimedia content corresponding to the link information received from the electronic device.

21. An electronic device comprising:

an ultra-wideband (UWB) communication module;

a communication module; and a processor, memory storing instructions that, when executed by the processor, cause the electronic device to:

determine a position of the electronic device based on a UWB signal received through the UWB communication module;

based on a result of comparing the position and map information defining a plurality of areas included in a space where an external device transmitting the UWB signal is installed, determine an area where the electronic device is positioned among the plurality of areas;

play a multimedia content corresponding to the area;

acquire interest information regarding a plurality of multimedia contents comprising the multimedia content played by the electronic device;

select at least one multimedia content from the plurality of multimedia contents based on the interest information;

transmit, to a server, a request for generating a user multimedia content by using the at least one multimedia content, wherein the user multimedia content is generated based at least in part on a number of multimedia contents played by the electronic device and a number of spaces; and receive, from the server, link information corresponding to the user multimedia content.

22. The electronic device of claim 1, wherein the generated user multimedia content to be transmitted to the server includes an identification code corresponding to the at least one selected multimedia content, and the server pre-stores the identification code and the at least one selected multimedia content.

23. A method, comprising:

determining a distance, based on an ultra-wideband (UWB) signal received through a UWB communication module included in the electronic device, between the electronic device and a target;

selecting a user interface from a plurality of user interfaces based on the distance;

displaying, on a display of the electronic device, the user interface selected from the plurality of user interfaces based on the target;

displaying, on the display of the electronic device, multimedia content associated with the target;

acquiring interest information regarding the multimedia content; and causing a user multimedia content to be generated based on the interest information, wherein the user multimedia content is generated based at least in part on a number of multimedia contents played by the electronic device and a number of spaces.

24. The method of claim 23, further comprising:

responsive to detecting a change in the distance, based on the UWB signal, between the electronic device and the target, selecting another user interface from the plurality of user interfaces based on the change in the distance; and displaying, on the display of the electronic device, the another user interface selected from the plurality of user interfaces based on the change in the distance.

25. The method of claim 23, further comprising:

responsive to detecting a change in the distance, based on the UWB signal, between the electronic device and the target, and responsive to a designated time having elapsed, selecting another user interface from the plurality of user interfaces based on the change in the distance; and displaying, on the display of the electronic device, the another user interface selected from the plurality of user interfaces based on the change in the distance.

26. The method of claim 23, further comprising:

determining a degree of interest in the multimedia content based on the interest information.

* * * * *